(12) United States Patent
Batchelder

(10) Patent No.: US 10,369,776 B2
(45) Date of Patent: *Aug. 6, 2019

(54) ADDITIVE MANUFACTURING SYSTEM AND METHOD FOR PRINTING THREE-DIMENSIONAL PARTS USING VELOCIMETRY

(71) Applicant: Stratasys, Inc., Eden Prairie, MN (US)

(72) Inventor: J. Samuel Batchelder, Somers, NY (US)

(73) Assignee: STRATASYS, INC., Eden Prairie, MN (US)

(*) Notice: Subject to any disclaimer, the term of this patent is extended or adjusted under 35 U.S.C. 154(b) by 250 days.

This patent is subject to a terminal disclaimer.

(21) Appl. No.: 15/386,912

(22) Filed: Dec. 21, 2016

(65) Prior Publication Data

US 2017/0100888 A1  Apr. 13, 2017

Related U.S. Application Data

(63) Continuation of application No. 13/840,538, filed on Mar. 15, 2013, now Pat. No. 9,527,240.

(51) Int. Cl.
*B29C 67/00* (2017.01)
*B33Y 50/02* (2015.01)
(Continued)

(52) U.S. Cl.
CPC ............ *B33Y 10/00* (2014.12); *B29C 64/106* (2017.08); *B29C 64/20* (2017.08); *B33Y 30/00* (2014.12);
(Continued)

(58) Field of Classification Search
CPC ... B29C 64/106; B29C 64/118; B29C 64/112; B29C 64/20; B29C 64/209; B33Y 10/00; B33Y 30/00; B33Y 50/02; G01F 1/661

See application file for complete search history.

(56) References Cited

U.S. PATENT DOCUMENTS 4,479,347 A   10/1984  Larsen et al.
4,537,503 A    8/1985  Liu
(Continued)

FOREIGN PATENT DOCUMENTS

CA      2348246 A1    5/2001
WO   2013006399 A2    1/2013

OTHER PUBLICATIONS

Extended European Search Report dated Oct. 21, 2016 for corresponding European Application No. 14770776.4, filed Feb. 19, 2014.
(Continued)

*Primary Examiner* — Anthony Calandra
*Assistant Examiner* — Jerzi H Moreno Hernandez
(74) *Attorney, Agent, or Firm* — Westman, Champlin & Koehler, P.A.

(57) ABSTRACT

An additive manufacturing system that retains a print head for printing a three-dimensional part in a layer-by-layer manner using an additive manufacturing technique, where the retained print head is configured to receive a consumable material, melt the consumable material, and extrude the molten material. The system also includes a velocimetry assembly configured to determine flow rates of the molten material, and a controller assembly configured to manage the extrusion of the molten material from the print head, and to receive signals from the velocimetry assembly relating to the determined flow rates.

17 Claims, 12 Drawing Sheets

(51) Int. Cl.
*B33Y 10/00* (2015.01)
*B33Y 30/00* (2015.01)
*G01F 1/66* (2006.01)
*B29C 64/106* (2017.01)
*B29C 64/20* (2017.01)
*B29C 64/209* (2017.01)

(52) U.S. Cl.
CPC .............. *B33Y 50/02* (2014.12); *G01F 1/661* (2013.01); *B29C 64/209* (2017.08)

(56) References Cited

U.S. PATENT DOCUMENTS

| | | | |
|---|---|---|---|
| 4,797,313 A | 1/1989 | Stolk et al. | |
| 4,866,639 A | 9/1989 | Adrian | |
| 5,002,389 A | 3/1991 | Benser | |
| 5,121,329 A | 6/1992 | Crump | |
| 5,169,081 A | 12/1992 | Goedderz | |
| 5,231,463 A * | 7/1993 | Shambaugh | G01F 1/661 356/336 |
| 5,258,148 A | 11/1993 | Sensen et al. | |
| 5,303,141 A | 4/1994 | Batchelder et al. | |
| 5,312,224 A | 5/1994 | Batchelder et al. | |
| 5,340,433 A | 8/1994 | Crump | |
| 5,342,687 A | 8/1994 | Iwai et al. | |
| 5,491,642 A | 2/1996 | Wormell et al. | |
| 5,503,785 A | 4/1996 | Crump et al. | |
| 5,738,817 A | 4/1998 | Danforth et al. | |
| 5,764,521 A | 6/1998 | Batchelder et al. | |
| 5,866,058 A | 2/1999 | Batchelder et al. | |
| 5,900,207 A | 5/1999 | Danforth et al. | |
| 5,939,008 A | 8/1999 | Comb et al. | |
| 5,968,561 A | 10/1999 | Batchelder et al. | |
| 6,004,124 A | 12/1999 | Swanson et al. | |
| 6,022,207 A | 2/2000 | Dahlin et al. | |
| 6,054,077 A | 4/2000 | Comb et al. | |
| 6,067,480 A | 5/2000 | Stuffle et al. | |
| 6,070,107 A | 5/2000 | Lombardi et al. | |
| 6,085,957 A * | 7/2000 | Zinniel | B65H 51/30 226/43 |
| 6,129,872 A | 10/2000 | Jang | |
| 6,228,923 B1 | 5/2001 | Lombardi et al. | |
| 6,257,517 B1 | 7/2001 | Babish et al. | |
| 6,481,268 B1 | 11/2002 | Povey et al. | |
| 6,547,995 B1 | 4/2003 | Comb | |
| 6,645,412 B2 | 11/2003 | Priedeman, Jr. | |
| 6,685,866 B2 | 2/2004 | Swanson et al. | |
| 6,722,872 B1 | 4/2004 | Swanson et al. | |
| 6,730,252 B1 | 5/2004 | Teoh et al. | |
| 6,749,414 B1 | 6/2004 | Hanson et al. | |
| 6,782,303 B1 * | 8/2004 | Fong | G05B 19/4099 700/119 |
| 6,790,403 B1 | 9/2004 | Priedeman, Jr. et al. | |
| 6,814,907 B1 * | 11/2004 | Comb | B29C 41/36 264/308 |
| 6,869,559 B2 | 3/2005 | Hopkins | |
| 6,923,634 B2 | 8/2005 | Swanson et al. | |
| 6,995,334 B1 | 2/2006 | Kovacevic et al. | |
| 6,998,087 B1 | 2/2006 | Hanson et al. | |
| 7,122,246 B2 | 10/2006 | Comb et al. | |
| 7,127,309 B2 | 10/2006 | Dunn et al. | |
| 7,172,715 B2 | 2/2007 | Swanson et al. | |
| 7,363,686 B2 | 4/2008 | Fukuyasu et al. | |
| 7,384,255 B2 | 6/2008 | LaBossiere et al. | |
| 7,604,470 B2 | 10/2009 | LaBossiere et al. | |
| 7,625,200 B2 | 12/2009 | Leavitt | |
| 7,744,364 B2 | 6/2010 | Turley et al. | |
| 7,896,209 B2 | 3/2011 | Batchelder et al. | |
| 8,153,182 B2 | 4/2012 | Comb et al. | |
| 8,221,669 B2 | 7/2012 | Batchelder et al. | |
| 8,236,227 B2 | 8/2012 | Batchelder et al. | |
| 9,527,240 B2 * | 12/2016 | Batchelder | B33Y 50/02 |
| 2005/0129941 A1 | 6/2005 | Comb et al. | |
| 2005/0161469 A1 * | 7/2005 | Roady | B67D 1/0006 222/52 |
| 2006/0111807 A1 * | 5/2006 | Gothait | B33Y 30/00 700/119 |
| 2007/0003656 A1 | 1/2007 | LaBossiere et al. | |
| 2007/0228590 A1 | 10/2007 | LaBossiere et al. | |
| 2009/0035405 A1 | 2/2009 | Leavitt | |
| 2009/0134540 A1 * | 5/2009 | Khoshnevis | B28B 3/20 264/40.7 |
| 2009/0177098 A1 | 7/2009 | Yakubo et al. | |
| 2009/0263582 A1 | 10/2009 | Batchelder | |
| 2009/0273122 A1 | 11/2009 | Batchelder et al. | |
| 2009/0274540 A1 | 11/2009 | Batchelder et al. | |
| 2010/0018924 A1 | 1/2010 | Fendya et al. | |
| 2010/0096072 A1 | 4/2010 | Hopkins et al. | |
| 2010/0096485 A1 | 4/2010 | Taatjes et al. | |
| 2010/0096489 A1 | 4/2010 | Taatjes et al. | |
| 2010/0100224 A1 | 4/2010 | Comb et al. | |
| 2010/0283172 A1 | 11/2010 | Swanson | |
| 2010/0327479 A1 | 12/2010 | Zinniel et al. | |
| 2011/0074065 A1 | 3/2011 | Batchelder et al. | |
| 2011/0076495 A1 | 3/2011 | Batchelder et al. | |
| 2011/0076496 A1 | 3/2011 | Batchelder et al. | |
| 2011/0114839 A1 | 5/2011 | Stecker et al. | |
| 2011/0117268 A1 | 5/2011 | Batchelder et al. | |
| 2011/0121476 A1 | 5/2011 | Batchelder et al. | |
| 2011/0233804 A1 | 9/2011 | Batchelder et al. | |
| 2011/0285984 A1 | 11/2011 | Christian et al. | |
| 2012/0018924 A1 | 1/2012 | Swanson et al. | |
| 2012/0068378 A1 | 3/2012 | Swanson et al. | |
| 2012/0070523 A1 | 3/2012 | Swanson et al. | |
| 2012/0164256 A1 | 6/2012 | Swanson et al. | |
| 2013/0078073 A1 | 3/2013 | Comb et al. | |
| 2013/0229655 A1 | 9/2013 | Kaye et al. | |
| 2014/0048970 A1 | 2/2014 | Batchelder et al. | |
| 2014/0052287 A1 | 2/2014 | Swanson et al. | |
| 2014/0252684 A1 | 9/2014 | Swanson et al. | |
| 2014/0314954 A1 | 10/2014 | Lewis et al. | |

OTHER PUBLICATIONS

Pita, "Time-resolved particle image velocimetry within the nozzle of a drop-on-demand printhead", 2012, Journal of Imaging Science and Technology, 56(5), 50401-1 (all).
Link, "In drop motion in wide-format printers: I. Drop flow from Drop-On-Demand (DOD) printing heads", 2009, Chemical Engineering and Processing: Process Intensification, n. 48.1, 68-83 (All).
Fathi, "Jet array driven flow on the nozzle plate of an inkjet printhead in deposition of molten nylon materials.", 2013, Journal of Materials Processing Technology, 213.3, 383-391.
Hansen, "High-Throughput Printing via Microvascular Multinozzle Arrays," 2013 Advanced Materials, 25.1, 96-102.
http://en.wikipedia.org/wiki/Laser_surface_velocimeter, "Laser surface velocimeter", Mar. 22, 2013, pp. 1-3.
http://en.wikipedia.org/wiki/Velocimetry, "Velocimetry", Jun. 25, 2012, pp. 1-2.
International Search Report and Written Opinion dated Jun. 24, 2014 for corresponding International Patent Application No. PCT/US2014/017072, filed Feb. 19, 2014.

* cited by examiner

ADDITIVE MANUFACTURING SYSTEM AND METHOD FOR PRINTING THREE-DIMENSIONAL PARTS USING VELOCIMETRY

CROSS-REFERENCE TO RELATED APPLICATION(S)

This Application is a Continuation Application of U.S. patent application Ser. No. 13/840,538, filed Mar. 15, 2013, the contents of which are hereby incorporated by reference in its entirety.

BACKGROUND

The present disclosure relates to additive manufacturing systems for printing or otherwise building three-dimensional (3D) parts with layer-based, additive manufacturing techniques. In particular, the present disclosure relates to flow rate detection techniques for use in extrusion-based additive manufacturing systems.

Additive manufacturing systems are used to print or otherwise build 3D parts from digital representations of the 3D parts (e.g., AMF and STL format files) using one or more additive manufacturing techniques. Examples of commercially available additive manufacturing techniques include extrusion-based techniques, jetting, selective laser sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to print the given layer.

For example, in an extrusion-based additive manufacturing system, a 3D part may be printed from a digital representation of the 3D part in a layer-by-layer manner by extruding a flowable part material. The part material is extruded through an extrusion tip carried by a print head of the system, and is deposited as a sequence of roads on a substrate in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation.

In fabricating 3D parts by depositing layers of a part material, supporting layers or structures are typically built underneath overhanging portions or in cavities of 3D parts under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited from a second nozzle pursuant to the generated geometry during the printing process. The support material adheres to the part material during fabrication, and is removable from the completed 3D part when the printing process is complete.

SUMMARY

An aspect of the present disclosure is directed to an additive manufacturing system that includes a print head for printing a 3D part in a layer-by-layer manner using an additive manufacturing technique. The print head is configured to receive a consumable material, melt the consumable material, and extrude the molten material. The system also includes a velocimetry assembly configured to determine flow rates of the molten material, and a controller assembly configured to manage the extrusion of the molten material from the print head, and to receive signals from the velocimetry assembly relating to the determined flow rates.

Another aspect of the present disclosure is directed to a method for using an additive manufacturing system, which includes providing a print head retained by the additive manufacturing system, feeding a consumable material to the print head, melting the consumable material in the print head to produce a pre-extrudate of the molten consumable material, and extruding the pre-extrudate from the print head as an extrudate. The method also includes determining flow rates of the pre-extrudate or the extrudate with a velocimetry assembly.

Another aspect of the present disclosure is directed to a method for using an additive manufacturing system, which includes extruding a molten material from a print head retained by the additive manufacturing system as an extrudate, and routing a pulsed laser beam toward the extrudate to scatter light rays of the pulsed laser beam from the extrudate. The method also includes detecting at least a portion of the scattered light rays with a detector over multiple captured frames, wherein each captured frame has a speckle pattern, and comparing the speckle pattern of the multiple captured frames to determine flow rates of the extrudate.

DEFINITIONS

Unless otherwise specified, the following terms as used herein have the meanings provided below:

The term "extrudate" refers to a molten or partially molten material after exiting an extrusion nozzle. In comparison, the term "pre-extrudate" refers to a molten or partially molten material prior to exiting an extrusion nozzle, such as a molten or partially molten material flowing through the extrusion nozzle. Upon, exiting the extrusion nozzle, the "pre-extrudate" forms the "extrudate".

The term "flow rate", with reference to an extrudate or a pre-extrudate, refers to a velocity of the extrudate or pre-extrudate, a volumetric flow rate of the extrudate or pre-extrudate, or both.

The term "controller assembly", with reference to an additive manufacturing system, refers to one or more control circuits, one or more computer-based systems, or combinations thereof, which are configured to manage the operation of the additive manufacturing system, and which may be internal and/or external to the additive manufacturing system.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

Directional orientations such as "above", "below", "top", "bottom", and the like are made with reference to a layer-printing direction of a 3D part. In the embodiments shown below, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis.

The term "providing", such as for "providing a print head", when recited in the claims, is not intended to require any particular delivery or receipt of the provided item. Rather, the term "providing" is merely used to recite items that will be referred to in subsequent elements of the claim(s), for purposes of clarity and ease of readability.

The terms "about" and "substantially" are used herein with respect to measurable values and ranges due to expected variations known to those skilled in the art (e.g., limitations and variabilities in measurements).

DETAILED DESCRIPTION

Figure 1:
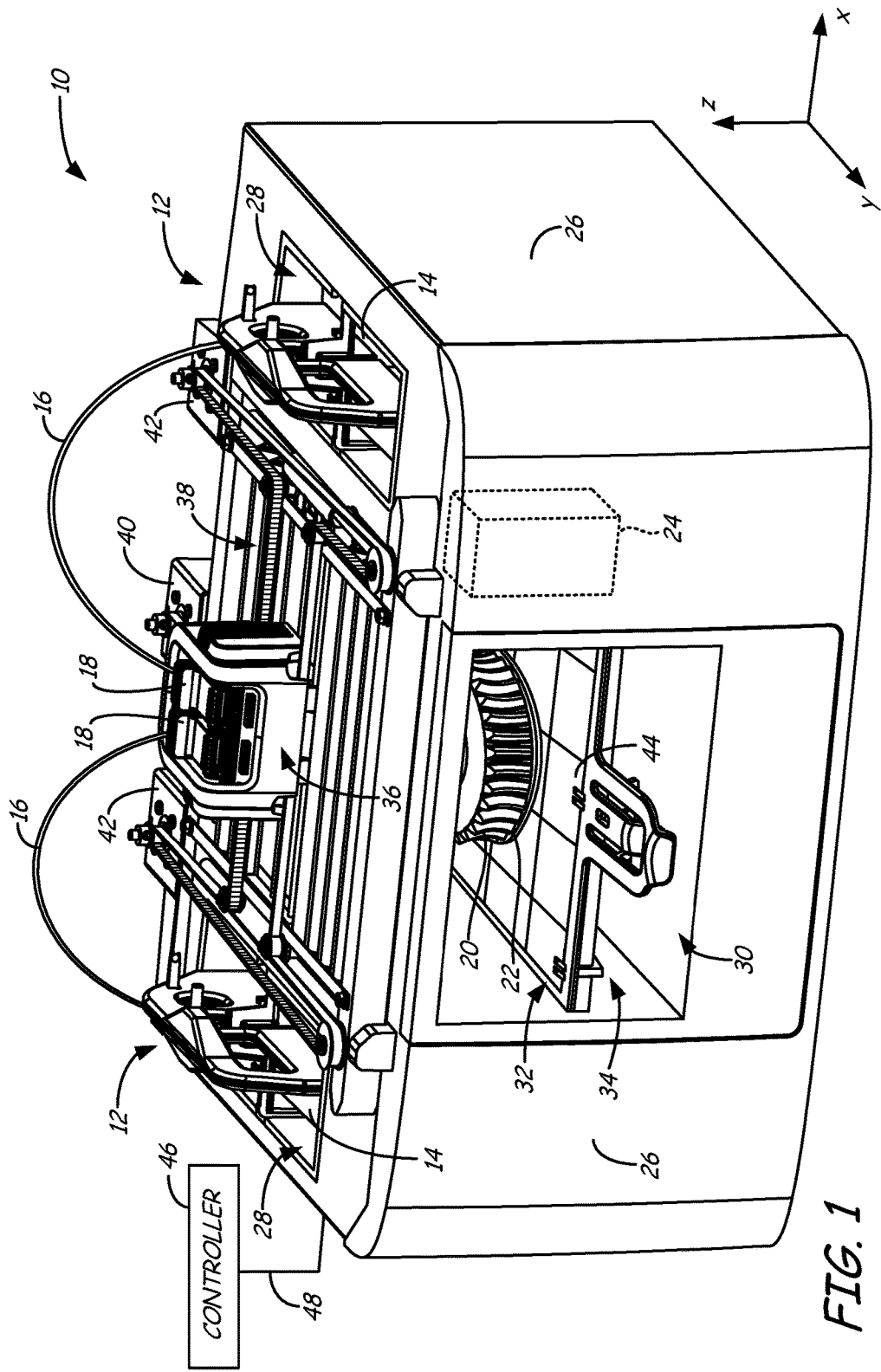
FIG. 1 is a top, front perspective view of an additive manufacturing system in use with consumable assemblies, which includes one or more velocimetry assemblies.

The present disclosure is directed to an additive manufacturing system and method for printing 3D parts and support structures using velocimetry. As discussed below, the additive manufacturing system may include a velocimetry assembly (or multiple velocimetry assemblies) configured to determine material flow rates (e.g., velocities and/or volumetric flow rates) of a print head extrudate and/or pre-extrudate, as defined above. The velocimetry assembly preferably transmits signals relating to the determined flow rates to a controller assembly of the additive manufacturing system (e.g., a move compiler), which may then utilize the received information to compensate for variations in the material flow rates.

For example, in a first embodiment, the velocimetry assembly may be used as a calibration tool for each print head of the additive manufacturing system. In this embodiment, the velocimetry assembly may measure flow rates of the print head extrudate in response to different filament drive commands. This calibration routine may also be performed periodically to identify gradual changes in the extrudate flow rates. For example, over extended periods of operation, the print heads may potentially develop liquefier scaling, material accumulation, and the like, which can change the relationships between the filament drive commands and the resulting extrudate flow rates. Periodic calibrations may allow the controller assembly to compensate for these changes and/or may be used to identify when a given print head should be cleaned or replaced.

As a calibration tool, the velocimetry assembly is preferably located at a fixed location, such as at a purge station, allowing it to be used when needed. Alternatively, the velocimetry assembly may be located at a stand-alone station outside of the additive manufacturing system. In this case, each print head may be calibrated with the velocimetry assembly before being loaded or installed to the additive manufacturing system, and the calibration information may be transmitted to the controller assembly of the system for subsequent use.

In a second embodiment, the velocimetry assembly may be used during printing operations to monitor extrudate flow rates while printing 3D parts and support structures. This can assist the controller assembly in managing the printing operations. Additionally, in this embodiment, the velocimetry assembly may be used to identify extrusion variations, such as tip clogging, extrudate back-pressure changes, and thermal degradation of the consumable material, which can otherwise affect printing operations. For example, thermal degradation of the consumable material can result in the material accumulating on the inner surface of a print head liquefier, which can change (i.e., increase) response time delays. When operating in this manner, a velocimetry assembly is preferably retained by each print head or by a head carriage for the print heads.

In a further embodiment, an additional velocimetry assembly may be used to measure feed rates of consumable filaments as the filaments are fed to a print head. This may assist in further reducing response times, as well as for detecting potential filament feed issues, such as filament breakage, jamming, and the like.

FIG. 1 shows system 10 in use with two consumable assemblies 12, which illustrates a suitable additive manufacturing system that includes one or more velocimetry assemblies for determining flow rates of print head extrudates (or pre-extrudates), and/or feed rates of consumable filaments. Each consumable assembly 12 is an easily loadable, removable, and replaceable container device that retains a supply of a consumable filament for printing with system 10. Typically, one of the consumable assemblies 12 contains a part material filament ("part material consumable assembly"), and the other consumable assembly 12 contains a support material filament ("support material consumable assembly"). However, both consumable assemblies 12 may be identical in structure.

In the shown embodiment, each consumable assembly 12 includes container portion 14, guide tube 16, and print heads 18. Container portion 14 may retain a spool or coil of a consumable filament, such as discussed in Mannella et al., U.S. patent application Ser. Nos. 13/334,910 and 13/334,921. Guide tube 16 interconnects container portion 14 and print head 18, where a drive mechanism of print head 18 (or of system 10) draws successive segments of the consumable filament from container portion 14, through guide tube 16, to a liquefier assembly of the print head 18.

In this embodiment, guide tube 16 and print head 18 are subcomponents of consumable assembly 12, and may be interchanged to and from system 10 with each consumable assembly 12. In alternative embodiments, guide tube 16 and/or print head 18 may be components of system 10, rather than subcomponents of consumable assemblies 12.

System 10 is an additive manufacturing system for printing 3D parts or models and corresponding support structures (e.g., 3D part 20 and support structure 22) from the part and support material filaments, respectively, of consumable assemblies 12, using a layer-based, additive manufacturing technique, and with the use of one or more velocimetry assemblies (not shown in FIG. 1). Suitable additive manufacturing systems for system 10 include extrusion-based systems developed by Stratasys, Inc., Eden Prairie, Minn. under the trademarks "FDM" and "FUSED DEPOSITION MODELING".

As shown, system 10 optionally includes one or more purge stations (e.g., purge station 24, shown with hidden lines), and further includes system casing 26, two bays 28, chamber 30, platen 32, platen gantry 34, head carriage 36, head gantry 38, z-axis motor 40, and a pair of x-y motors 42. Purge station 24 is a suitable device for performing purge operations, where each print head may extrude a strand of the part or support material into a purge bucket, optionally followed by a tip wipe operation, such as discussed in Turley et al., U.S. Pat. No. 7,744,364. As discussed above, in the first embodiment, the velocimetry assembly may retained at purge station 24 to measure extrudate flow rates from each print head 18 during purge operations (e.g., for calibration purposes).

System casing 26 is a structural component of system 10 and may include multiple structural sub-components such as support frames, housing walls, and the like. In the shown embodiment, system casing 26 defines the dimensions of bays 28, and of chamber 30. Bays 28 are container bays configured to respectively receive container portions 14 of consumable assemblies 12. Typically, each of bays 28 may be intended to receive either a part material consumable assembly 12 or a support material consumable assembly 12.

In an alternative embodiment, bays 28 may be omitted to reduce the overall footprint of system 10. In this embodiment, container portions 14 may stand adjacent to system casing 26, while providing sufficient ranges of movement for guide tubes 16 and print heads 18. Bays 28, however, provide convenient locations for loading consumable assemblies 12.

Chamber 30 is an enclosed environment that contains platen 32 for printing 3D part 22 and support structure 24. Chamber 30 may be heated (e.g., with circulating heated air) to reduce the rate at which the part and support materials solidify after being extruded and deposited (e.g., to reduce distortions and curling). In alternative embodiments, chamber 30 may be omitted and/or replaced with different types of build environments. For example, 3D part 22 and support structure 24 may be built in a build environment that is open to ambient conditions or may be enclosed with alternative structures (e.g., flexible curtains).

Platen 32 is a platform on which 3D part 20 and support structure 22 are printed in a layer-by-layer manner, and is supported by platen gantry 34. In some embodiments, platen 32 may engage and support a build substrate 44, which may be a tray substrate as disclosed in Dunn et al., U.S. Pat. No. 7,127,309, fabricated from plastic, corrugated cardboard, or other suitable material, and may also include a flexible polymeric film or liner, painter's tape, polyimide tape (e.g., under the trademark KAPTON from E.I. du Pont de Nemours and Company, Wilmington, Del.), or other disposable fabrication for adhering deposited material onto the platen 32 or onto the build substrate 44. Platen gantry 34 is a gantry assembly configured to move platen 32 along (or substantially along) the vertical z-axis and is powered by z-axis motor 40.

Head carriage 36 is a unit configured to receive one or more removable print heads, such as print heads 18, and is supported by head gantry 38. Examples of suitable devices for head carriage 36, and techniques for retaining print heads 18 in head carriage 36, include those disclosed in Swanson et al., U.S. Publication Nos. 2010/0283172 and 2012/0164256. As mentioned above, in the second embodiment, each print head 18 may retain a velocimetry assembly, or head carriage 36 itself may retain a pair of velocimetry assemblies for use with each inserted print head 18.

As mentioned above, in some embodiments, guide tube 16 and/or print head 18 may be components of system 10, rather than subcomponents of consumable assemblies 12. In these embodiments, additional examples of suitable devices for print heads 18, and the connections between print heads 18, head carriage 36, and head gantry 38 include those disclosed in Crump et al., U.S. Pat. No. 5,503,785; Swanson et al., U.S. Pat. No. 6,004,124; LaBossiere, et al., U.S. Pat. Nos. 7,384,255 and 7,604,470; Batchelder et al., U.S. Pat. No. 7,896,209; and Comb et al., U.S. Pat. No. 8,153,182.

In the shown embodiment, head gantry 38 is a belt-driven gantry assembly configured to move head carriage 36 (and the retained print heads 18) in (or substantially in) a horizontal x-y plane above chamber 30, and is powered by x-y motors 42. Examples of suitable gantry assemblies for head gantry 38 include those disclosed in Comb et al., U.S. Pat. No. 13/242,561.

In an alternative embodiment, platen 32 may be configured to move in the horizontal x-y plane within chamber 30, and head carriage 36 (and print heads 18) may be configured to move along the z-axis. Other similar arrangements may also be used such that one or both of platen 32 and print heads 18 are moveable relative to each other. Platen 32 and head carriage 36 (and print heads 18) may also be oriented along different axes. For example, platen 32 may be oriented vertically and print heads 18 may print 3D part 22 and support structure 24 along the x-axis or the y-axis.

System 10 may also include a pair of sensor assemblies (not shown) configured to read encoded markings from successive segments of the consumable filaments moving through guide tubes 16, such as disclosed in Batchelder et al., U.S. Patent Application Publication Nos. 2011/0117268, 2011/0121476, and 2011/0233804; and in Swanson et al., U.S. Publication Nos. 2010/0283172 and 2012/0164256. These sensor assemblies may be used in combination with the one or more velocimetry assemblies for providing one or more feed-forward and feedback control loops to compensate for filament feed variations and/or extrudate flow variations.

System 10 also includes controller assembly 46, which may include one or more control circuits and/or one or more host computers configured to monitor and operate the components of system 10. For example, one or more of the control functions performed by controller assembly 46, such as performing move compiler functions, can be implemented in hardware, software, firmware, and the like, or a combination thereof; and may include computer-based hardware, such as data storage devices, processors, memory modules, and the like, which may be external and/or internal to system 10.

Controller assembly 46 may communicate over communication line 48 with print heads 18, chamber 30 (e.g., with a heating unit for chamber 30), head carriage 36, motors 40 and 42, sensor assemblies 44, the one or more velocimetry assemblies, and various sensors, calibration devices, display devices, and/or user input devices. In some embodiments, controller assembly 46 may also communicate with one or more of bays 28, platen 32, platen gantry 34, head gantry 38, and any other suitable component of system 10. While illustrated as a single signal line, communication line 48 may include one or more electrical, optical, and/or wireless signal lines, which may be external and/or internal to system 10, allowing controller assembly 46 to communicate with various components of system 10.

During operation, controller assembly 46 may direct z-axis motor 40 and platen gantry 34 to move platen 32 to a predetermined height within chamber 30. Controller assembly 46 may then direct motors 42 and head gantry 38 to move head carriage 36 (and the retained print heads 18) around in the horizontal x-y plane above chamber 30. Controller assembly 46 may also direct print heads 18 to selectively draw successive segments of the consumable filaments from container portions 14 and through guide tubes 16, respectively.

Figures 2A, 2B:
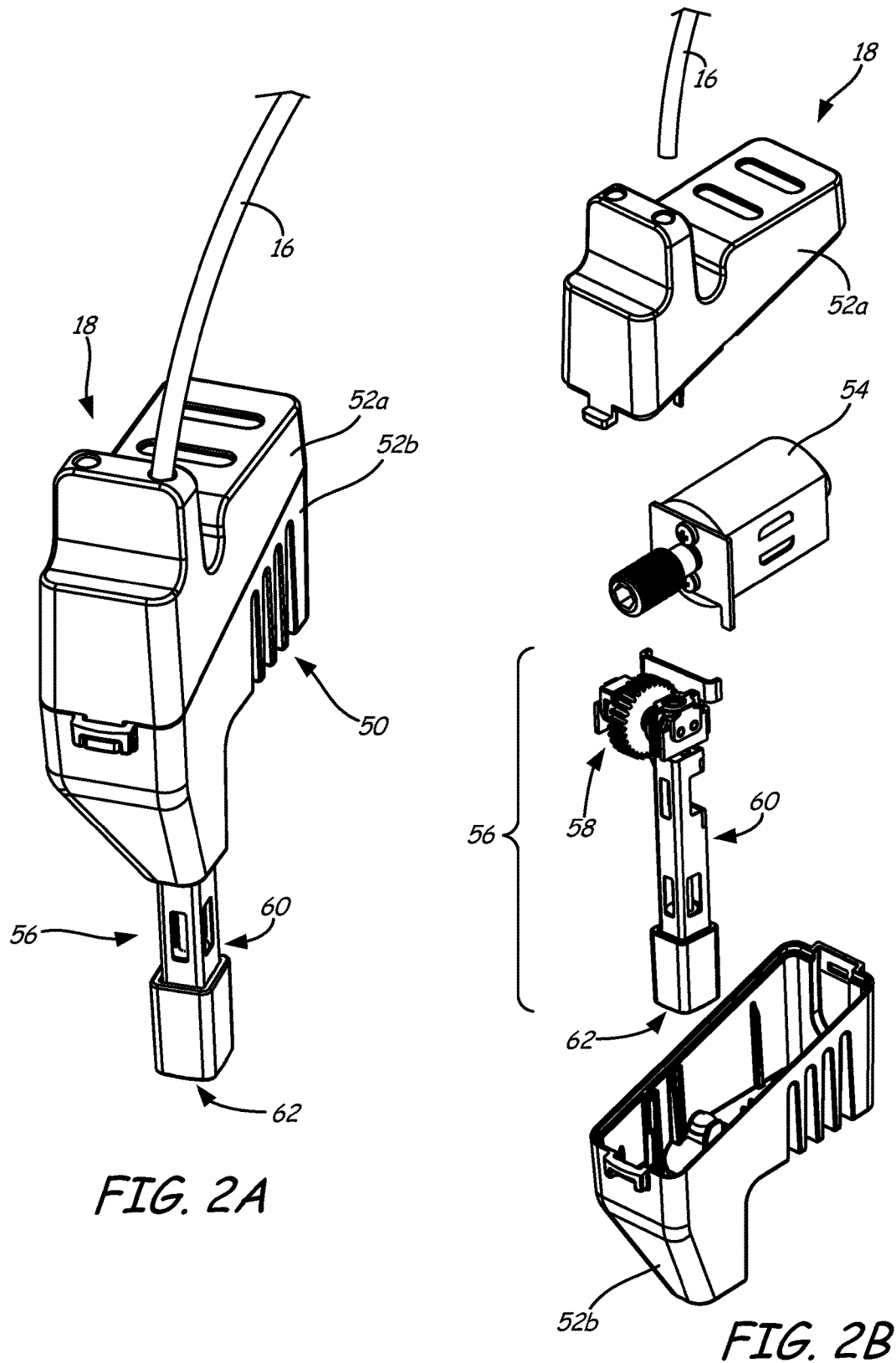
FIG. 2A is a perspective view of a print head and guide tube for use with the additive manufacturing system.
FIG. 2B is an exploded perspective view of the print head, showing a pump assembly.

FIGS. 2A and 2B illustrate an example print head 18, which includes housing 50 (having housing components 52*a* and 52*b*), motor assembly 54, and pump assembly 56 having drive mechanism 58 and liquefier assembly 60, where liquefier assembly 60 includes extrusion nozzle 62. Examples of suitable components for housing 50, motor assembly 54, and pump assembly 56 include those discussed in Swanson et al., U.S. Publication No. 2012/0164256, Koop et al., U.S. patent application Ser. No. 13/708,116; and Leavitt, U.S. patent application Ser. No. 13/708,037.

At each print head 18, controller assembly 46 directs motor assembly 54 to transfer rotational power to drive mechanism 58 to feed successive segments of the consumable filament to liquefier assembly 60. Liquefier assembly 60 thermally melts the received successive segments such that the consumable filament becomes a molten material. The molten material residing in nozzle 62 is then extruded from nozzle 62 and deposited onto platen 32 for printing 3D part 20 and support structure 22 in a layer-by-layer manner. After the print operation is complete, the resulting 3D part 20 and support structure 22 may be removed from chamber 30, and support structure 22 may be removed from 3D part 20. 3D part 20 may then undergo one or more additional post-processing steps.

Figure 3:
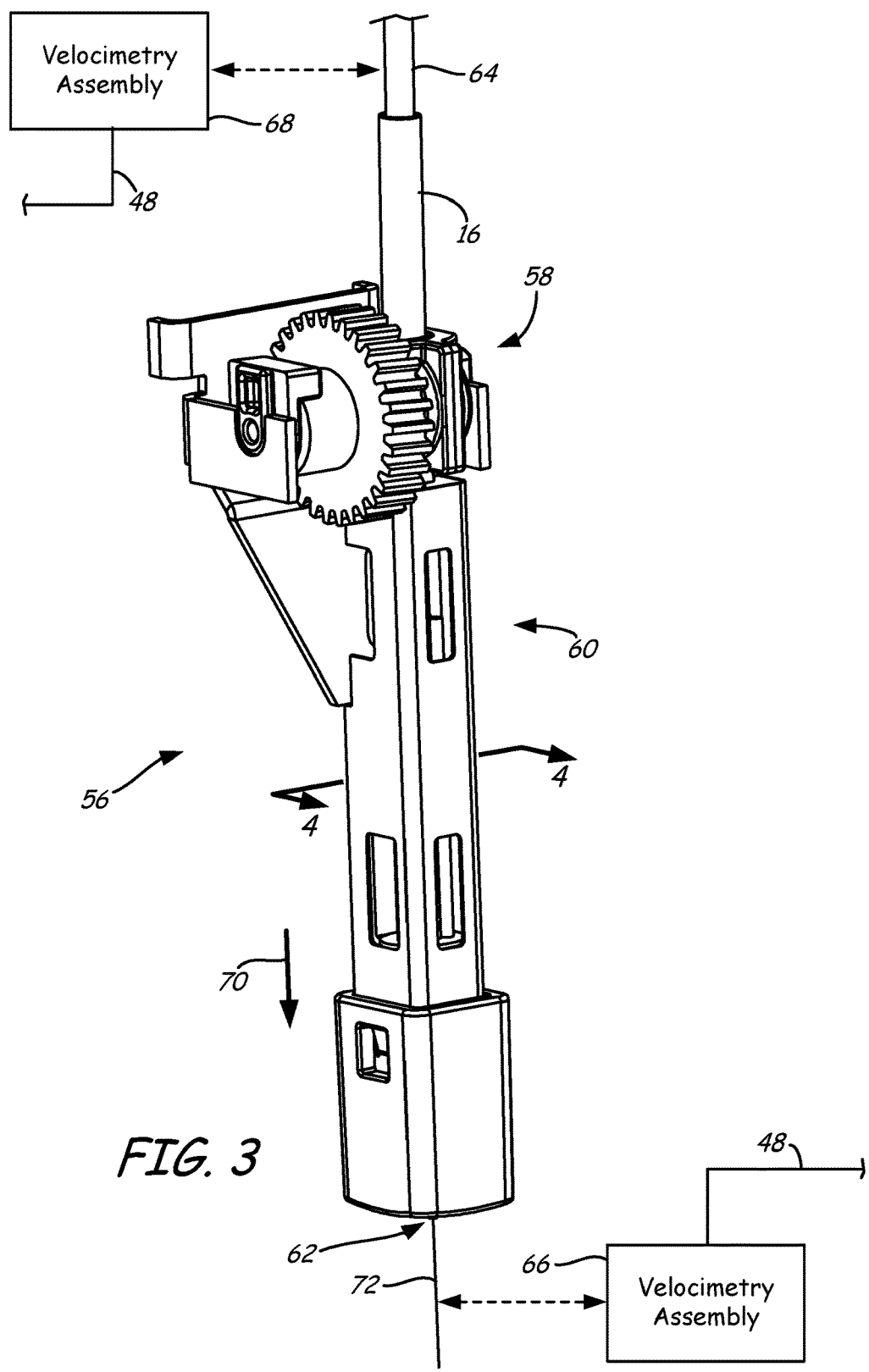
FIG. 3 is a perspective view of the pump assembly in use with the guide tube, a consumable filament, an extrudate velocimetry assembly, and a filament-feed velocimetry assembly.

FIG. 3 further illustrates pump assembly 56 in use with guide tube 16, filament 64 (shown extending through cutaway portion of guide tube 16), extrudate velocimetry assembly 66, and filament-feed velocimetry assembly 68. As shown, filament drive mechanism 58 of pump assembly 56 is located upstream from liquefier assembly 60, and is configured to feed successive portions of filament 64 from guide tube 16 to liquefier assembly 60 based on the rotational power of motor assembly 54 (shown in FIG. 2B). As used herein, the terms "upstream" and "downstream" are made with reference to a filament feed direction, such as along arrow 70, for example.

Extrudate velocimetry assembly 66 is configured to measure the flow rate of the molten consumable material of filament 64 that exits nozzle 62, referred to as extrudate 72. As mentioned above, velocimetry assembly 66 may be secured to print head 18, to head carriage 36, to purge station 24, or any other suitable location of system 10. Velocimetry assembly 66 preferably receives electrical power from system 10, and may communicate with controller assembly 46 over communication line 48.

Additionally, filament-feed velocimetry assembly 68 may optionally be included to measure the feed rate of filament 64 prior to entering liquefier assembly 60. In this case, velocimetry assembly 68 may be positioned at any suitable location between and including container 14 and liquefier assembly 60. For example, velocimetry assembly 68 may be retained by head carriage 36 to measure the feed rate of filament 64 in guide tube 16 (e.g., via an opening in guide tube 16) just prior to entering print head 18. Alternatively, velocimetry assembly 68 may be retained within housing 50 of print head 18 to measure the feed rate of filament 64 just prior to filament 64 entering liquefier assembly 60.

In a further alternative embodiment, velocimetry assembly 68 may be positioned at any suitable location along the pathway of guide tube 16, such as at the one or more above-discussed sensor assemblies (not shown) to measure the feed rate of filament 68 in guide tube 16. In a further alternative embodiment, velocimetry assembly 68 may be retained in bay 28 or in container 14 of a consumable assembly 12. When residing in container 14, the given container 14 may be configured to receive electrical power from system 10 and to communicate with controller assembly 46 when loaded to bay 28.

As can be appreciated, when utilizing both velocimetry assemblies 66 and 68, controller assembly 46 may compare the flow rates of extrudate 72 to the feed rates of filament 64 to improve printing efficiencies and to identify any anomalies that could indicate printing impairment (e.g., filament slippage and material accumulation in liquefier assembly 60). Alternatively (or additionally), controller assembly 46 may monitor drive power applied to motor assembly 54 and/or any rotary encoder associated with motor assembly 54 to detect potential filament feed anomalies that could indicate printing impairment.

Figure 4:
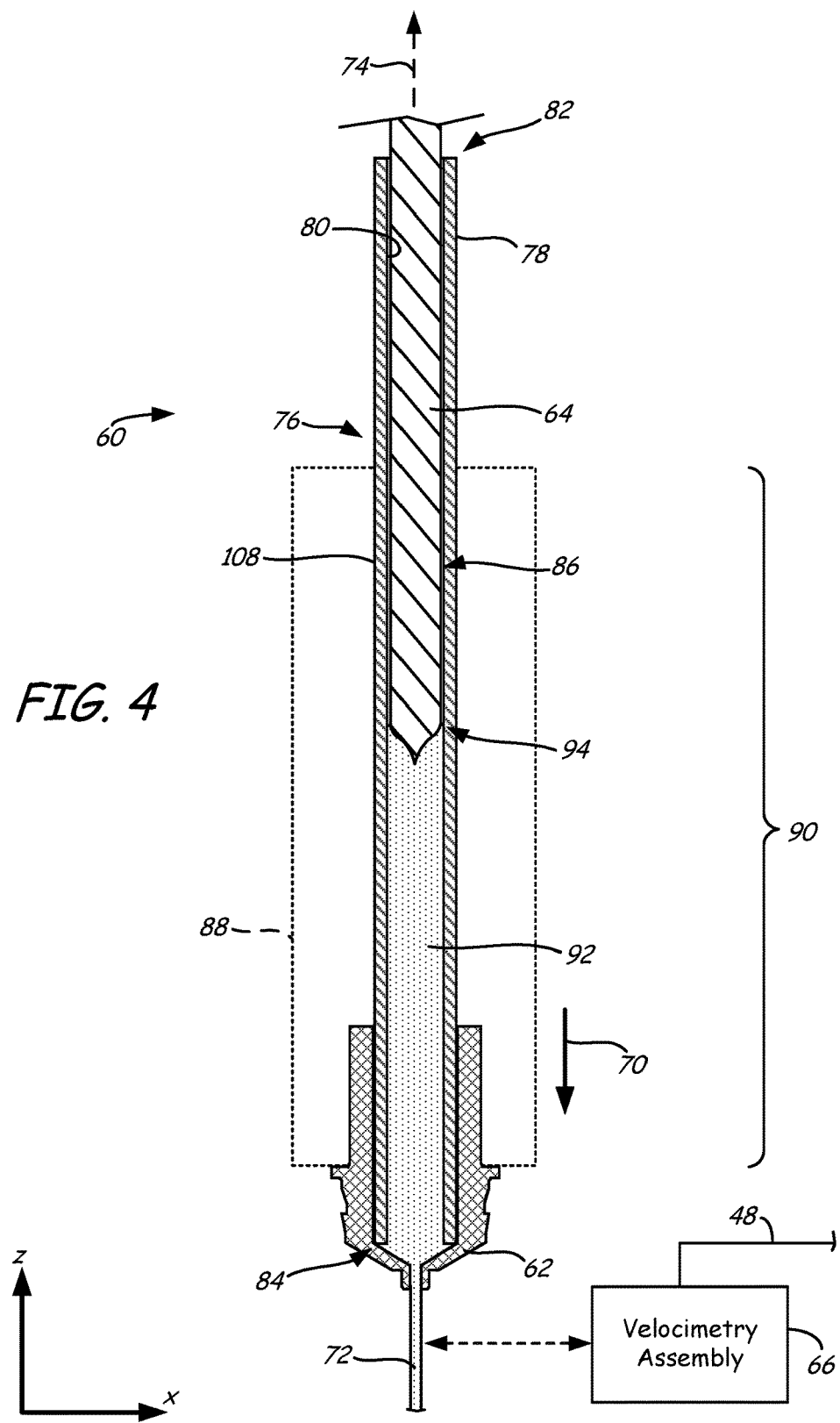
FIG. 4 is a sectional view of section 4-4 taken in FIG. 3, illustrating a liquefier assembly of the pump assembly in use with the extrudate velocimetry assembly.

As shown in FIG. 4, liquefier assembly 60 extends along longitudinal axis 74, and includes liquefier tube 76. Liquefier tube 76 is a rigid tube fabricated from one or more thermally-conductive materials (e.g., stainless steel), and includes outer surface 78 and inner surface 80, as well as inlet end 82, outlet end 84, and channel 86 extending therebetween along longitudinal 74. Liquefier tube 76 is preferably is thin walled, having a wall thickness between outer surface 78 and inner surface 80 ranging from about 0.01 inches to about 0.03 inches, and more preferably from about 0.015 to about 0.020. Preferred inner diameters for liquefier 76 range from about 0.08 inches to about 0.10 inches, more preferably from about 0.090 inches to about 0.095 inches.

The discussion of liquefier tube 76 is made herein with reference to longitudinal axis 74 and a cylindrical geometry extending along longitudinal axis 74. However, in alternative embodiments, liquefier tube 76 may have a non-cylindrical geometry, such as disclosed in Batchelder et al., U.S. Patent Application Publication No. 2011/0074065. Accordingly, as used herein unless otherwise indicated, the term "tube" may include a variety of hollow geometries, such as cylindrical geometries, elliptical geometries, polygonal geometries (e.g., rectangular and square geometries), axially-tapered geometries, and the like.

Liquefier assembly 76 is shown in use with thermal sleeve 88 (shown with hidden lines), which is an example heating element extending around a downstream segment of liquefier tube 76 to generate a hot zone along liquefier tube 76 during a printing operation. Examples of suitable assemblies for thermal sleeve 88 include those disclosed in Swanson et al., U.S. Publication Nos. 2012/0018924 and 2012/0070523. Other suitable configurations for thermal sleeve 88 include a heating block as disclosed in Swanson et al., U.S. Pat. No. 6,004,124, or other heating element configured to heat the hot zone. The thermal sleeve 88 may also include multiple heat-controlled zones to provide a multi-zone liquefier such as is disclosed in Swanson et al., U.S. Publication No. 2012/0018924.

Nozzle 62 is a small-diameter nozzle secured to liquefier tube 76 at outlet end 84, and is configured to extrude molten material at a desired road width. Preferred inner tip diameters for nozzle 62 include diameters up to about 760 micrometers (about 0.030 inches), and more preferably range from about 125 micrometers (about 0.005 inches) to about 510 micrometers (about 0.020 inches). In some embodiments, nozzle 62 may include one or more recessed grooves to produce roads having different road widths, as disclosed in Swanson et al., U.S. patent application Ser. No. 13/587,002.

As further discussed in Swanson et al., U.S. patent application Ser. No. 13/587,002, nozzle 62 may have an axial channel any suitable length-to-diameter ratio. For example, in some embodiments, nozzle 62 may have an axial channel with a length-to-diameter ratio to generate high flow resistance, such as a ratio of about 2:1 to about 5:1. In other embodiments, nozzle 62 may have an axial channel with a length-to-diameter ratio to generate lower flow resistance, such as a ratio less than about 1:1. Accordingly, suitable length-to-diameter ratios for the axial channel of nozzle 62 may range from about 1:2 to about 5:1, where in some low-flow resistance embodiments, ratios ranging from about 1:2 to about 1:1 may be preferred for use with the method of the present disclosure.

Suitable consumable filaments for filament 64 include those disclosed and listed in Crump et al., U.S. Pat. No. 5,503,785; Lombardi et al., U.S. Pat. Nos. 6,070,107 and 6,228,923; Priedeman et al., U.S. Pat. No. 6,790,403; Comb et al., U.S. Pat. No. 7,122,246; Batchelder, U.S. Patent Application Publication No. 2009/0263582; Hopkins et al., U.S. Patent Application Publication No. 2010/0096072; Batchelder et al., U.S. Patent Application Publication No. 2011/0076496; and Batchelder et al., U.S. Patent Application Publication No. 2011/0076495.

Furthermore, filament 64 may include encoded markings, as disclosed in Batchelder et al., U.S. Patent Application Publication Nos. 2011/0117268, 2011/0121476, and 2011/0233804, which may be used with the above-discussed sensor assemblies of system 10; and/or topographical surfaces patterns (e.g., tracks) as disclosed in Batchelder et al., U.S. Pat. No. 8,236,227. The length of filament 64 may be any suitable length, and is preferably more than about 100 feet.

Additionally, filament 64 may have a non-cylindrical geometry, such as a ribbon filament as disclosed in Batchelder et al., U.S. Pat. No. 8,221,669. In this embodiment, print head 18 may include a ribbon liquefier assembly as disclosed in Batchelder et al., U.S. Application Publication No. 2011/0074065; and in Swanson et al., U.S. Application Publication No. 2012/0070523, and as briefly mentioned above.

During the printing operation, drive mechanism 58 (shown in FIG. 2B) feeds filament 64 into channel 86 of liquefier tube 76 from inlet end 82, in the direction of arrow 70. Thermal sleeve 88 heats the encased region of liquefier tube 76 to one or more elevated temperatures to generate hot zone 90. The heating of liquefier tube 76 at hot zone 90 melts the material of filament 64 to form melt 92.

The molten portion of the filament material (i.e., melt 92) forms meniscus 94 around the unmelted portion of filament 64. During an extrusion of melt 92 through nozzle 62, the downward movement of filament 64 in the direction of arrow 70 functions as a viscosity pump to extrude the material in melt 92 out of nozzle 62 as extrudate 72 for printing 3D part 20 or support structure 22.

Changes in the flow rate of extrudate 72, such as when starting, stopping, accelerating, and decelerating is controlled by changing the feed rate of filament 64 with drive mechanism 58 (shown in FIG. 2B), based on drive commands from controller assembly 46. However, the flow rate of extrudate 72 out of nozzle 62 does not always respond the same to changes in the feed rate of filament 64. For example, extrudate 72 may flow at different rates from nozzle 62 for the same feed rate of filament 64 into liquefier tube 76. This is due to numerous non-steady state conditions within liquefier tube 64, such as changes in the melt flow characteristics of the consumable material, previous changes in filament feed rates and extrudate flow rates (e.g., during previous starting, stopping, accelerating, and/or decelerating), response time delays, and the like.

In an open loop design, without any feedback measurements of extrudate 72, controller assembly 46 typically operates print heads 18 based on predictive models on how extrudate 72 will flow. However, due to the virtually unlimited 3D part geometries that can be printed with system 10, it can be difficult to predict how print heads 18 will function in every situation. Furthermore, open loop designs will not detect gradual changes in print head 18 over time, such as liquefier scaling, material accumulation, and the like.

Instead, the extrudate flow rates measured and determined by velocimetry assembly 66 can be compared to filament drive commands, allowing system 10 to predict how extrudate flow rates will change based on a variety of operation conditions (i.e., calibrate print heads 18). Additionally, when velocimetry assembly 66 is retained by print head 18 or head carriage 36, the determined extrudate flow rates may be determined while performing printing operations. Each of the techniques can assist in reducing response time delays, and improving part quality and printing rates.

Figure 5:
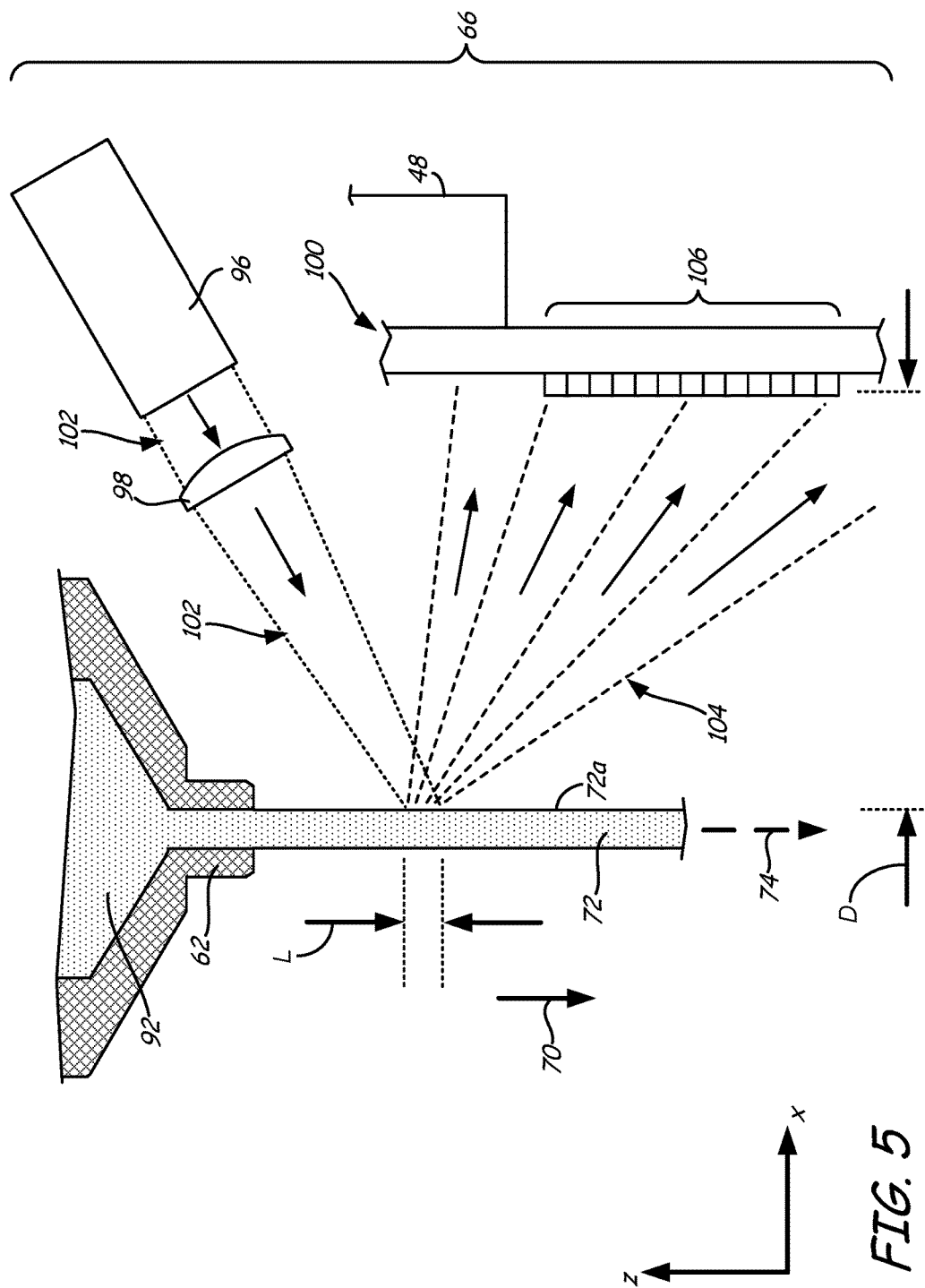
FIG. 5 is an expanded view of a nozzle of the liquefier assembly in use with the extrudate velocimetry assembly.

FIG. 5 illustrates an example embodiment for velocimetry assembly 66 in use with a print head 18 for measuring flow rates of extrudate 72. Due to its molten state, extrudate 72 has a generally smooth cylindrical surface of the molten part or support material, which provides very little particulate structure for optically measuring a flow rate. However, extrudate 72 exhibits light scattering, rendering it suitable for use with velocimetry assembly 66.

In the shown embodiment, velocimetry assembly 66 includes laser source 96, optionally one or more optic lenses 98 (illustrated as a collection lens 98), and detector 100, where detector 100 preferably communicates with controller assembly 46 over communication line 48. Laser source 96 is an example light source for velocimetry assembly 66, and may be any suitable laser beam-generating device for generating and directing a pulsed laser beam 102 towards collection lens 98, such as a laser diode or even an Nd:YAG laser, which may be bandwidth filtered to isolate any suitable wavelength.

Examples of suitable wavelengths "λ," for laser beam 102 range from about 300 nanometers to about 900 nanometers. In some embodiments, the wavelength "λ," for laser beam 102 ranges from about 600 nanometers to about 900 nanometers. In other embodiments, the wavelength "λ," for laser beam 102 ranges from about 400 nanometers to about 600 nanometers. In alternative embodiments, velocimetry assembly 66 may utilize different types of light sources for emitting light beams, such as super-radiant light-emitting diodes (LEDs) and the like.

Optic lenses 98 may include any suitable lens or set of lenses for optically expanding, condensing, collimating, and/or routing laser beam 102 toward a segment of extrudate 72 (i.e., at location below nozzle 62 along longitudinal axis 74), where the illuminated segment of extrudate 72 has a length "L" along longitudinal axis 74. Upon reaching extrudate 72, a portion of the light from laser beam 102 is scattered back towards sensor 104 as scattered rays 104, where the pattern of scatter rays 104 is based on a speckle pattern of extrudate 72 at the particular illuminated segment.

The dimensions for length "L" will vary depending on the focal volume of laser beam 102 relative to extrudate 72. Depending on the composition and color of the consumable material for extrudate 72, extrudate 72 may be partially transmissive such that the focal volume of laser beam 102 may penetrate into extrudate 72 to illuminate the core region of extrudate 72, for example. This will affect the dimensions for length "L", as well as the scatter pattern of rays 104.

Accordingly, due to the reflective nature of scatter rays 104 in this embodiment (in comparison to the transmission-forward-scatter pattern discussed below for velocimetry assemblies 134, 138, and 152, shown respectively in FIGS. 10-12), laser beam 102 may have a focal volume at about the exterior surface of extrudate 72, referred to as extrudate surface 72a. This allows velocimetry assembly 66 to determine the velocity of extrudate 72 at the extrudate surface 72a.

However, extrudate surface 72a may flow at a slower rate than its core region, providing a velocity gradient along its radius. This radial velocity gradient is typically greatest at nozzle 62, and equalizes in the extrudate after traveling a short distance from nozzle 62. As such, in this embodiment, the focal volume of laser beam 102 is preferably maintained at a point that is sufficiently distant from nozzle 62 such that the radial velocity gradient substantially equalizes between extrudate surface 72a and the core region of extrudate 72. The resulting velocity determined by velocimetry assembly 66 may then correspond to an average velocity with a low standard deviation over the radius of extrudate 72.

Velocimetry assembly 66 may also optionally include one or more additional optics (not shown) for expanding, condensing, collimating, and/or routing scattered rays 104 toward detector 100, wherein detector 100 has a sensor 106 with a plurality of photodetector pixels located at a distance "D" from the surface of extrudate 72 in a direction along the x-axis (i.e., perpendicular to longitudinal axis 74).

Detector 100 may be any suitable sensor device for detecting the intensities of scattered rays 104 in at least a one-dimensional (1D) pattern (i.e., in an array of pixels 106 extending along the z-axis), and or in a (2D) two-dimensional pattern (i.e., in a matrix of pixels 106 oriented in the y-z plane). As discussed below, in some embodiments, detector 100 may include multiple sensors 106, such as multiple 1D sensors, which can also be used to measure the width of extrudate 72 for determining the volumetric flow rate of extrudate 72, as discussed below.

Briefly, upon exiting nozzle 62, extrudate 72 also typically exhibits die swelling that can vary the diameter of extrudate by as much as 35%. As such, by measuring the diameter of extrudate 72 at the segment that is illuminated by laser beam 102, the cross-sectional area of the illuminated segment of extrudate 72 can be measured. Combining the measured cross-sectional area and the measured velocity may then provide volumetric flow rate for the illuminated segment of extrudate 72.

Examples of suitable devices for detector 100 include digital cameras, such as high-speed cameras incorporating charge-coupled device (CCD) or complementary metal-oxide-semiconductor (CMOS) chips. The intensity of laser beam 102 is preferably high enough such that the integration time of detector 100 is short enough to capture and process successive images of scattered rays 104 at a frame rate "R" that is synchronized in timing with the pulsing of laser beam 102. Accordingly, detector 100 preferably includes a timing circuit that captures frames at sensor 106 in response to each pulse of laser beam 102.

Figure 6:
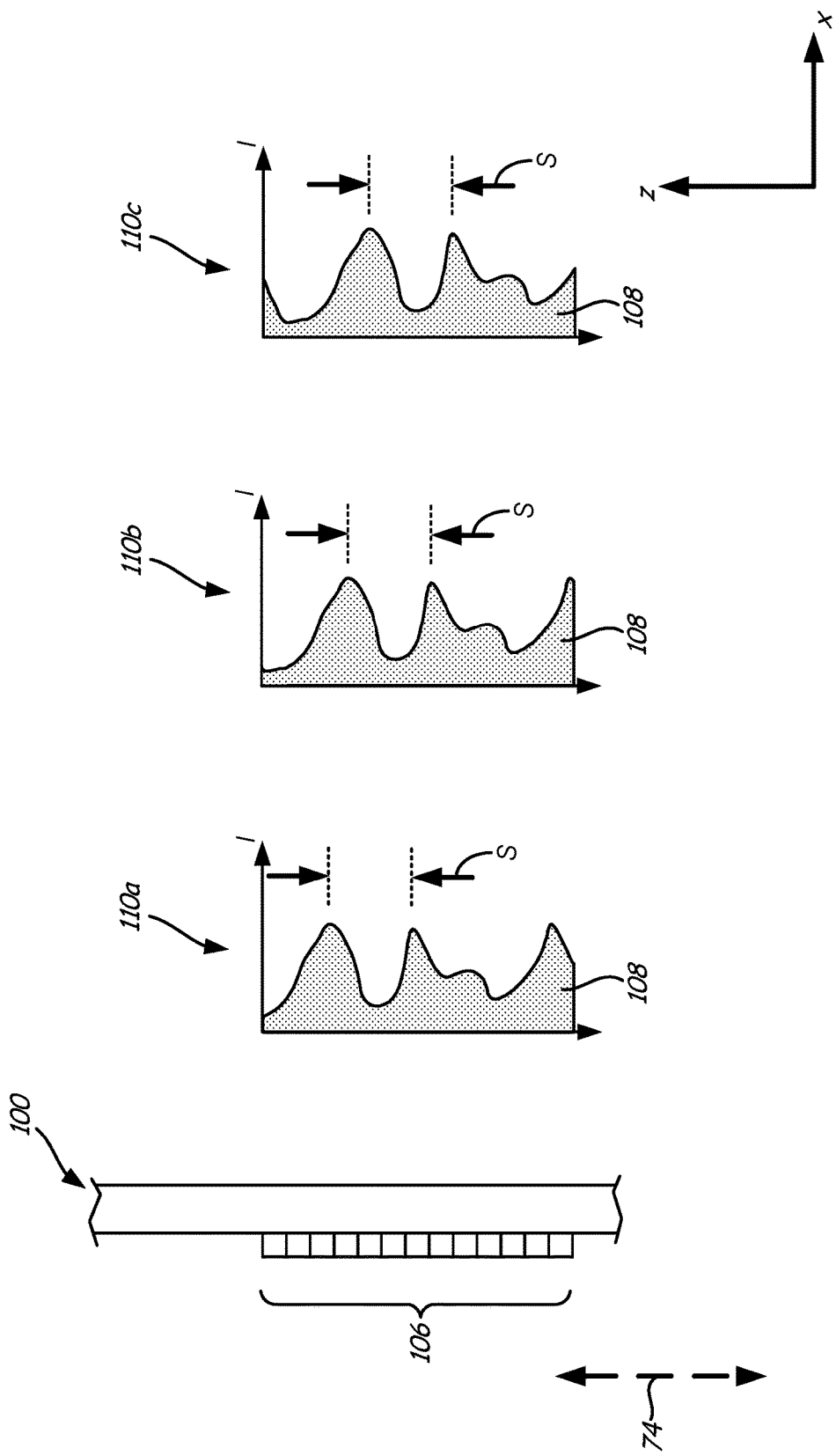
FIG. 6 is a schematic illustration of a detector of the extrudate velocimetry assembly and processed speckle patterns over successive frames.

As illustrated in FIG. 6, when successive frames of scattered rays 104 are captured by sensor 106, detector 100 (and/or controller assembly 46) may process the signals to generate a speckle pattern for each frame, such as the speckle pattern 108 plotted based on signal intensity "I" for successive frames 110a, 110b, and 110c. As shown, the speckles of extrudate 72 have an average speckle spacing "S", may be determined by Equation 1:

$$S = \frac{\lambda * D}{L} \quad \text{(Equation 1)}$$

where "λ," is the wavelength of laser beam 102, "D" is the distance between pixels 106 and the surface of extrudate 72 in a direction along the x-axis (i.e., perpendicular to longitudinal axis 74) as defined above, and "L" is a spot length of the segment of extrudate 72 along longitudinal axis 74 that is illuminated by laser beam 102 as defined above.

Examples of suitable distances "D" range from about 0.1 inches to about 5 inches, more preferably from about 0.1 inches to about 3 inches. Similarly, examples of suitable spot lengths "L" range from about 5 mils to about 100 mils, more preferably from about 10 mils to about 60 mils.

The speckle structure is determined by the details of index variations and surface features in extrudate 72. As such, apart from relativistic effects and mode structure within laser beam 102, speckle pattern 108 captured on detector 100 moves at the same velocity as extrudate 72 along longitudinal axis 74. This is illustrated in FIG. 6 with the downward spatial shift in speckle pattern 108 between the successive frames 110a, 110b, and 110c. Therefore, the downward (or positive) velocity of extrudate 72 along longitudinal axis 74 in the direction of arrow 70 may be determined as a function of the spatial shift of speckle pattern 108 between the successive frames 110a, 110b, and 110c. Similarly, if extrudate 72 is drawn back into nozzle 62 during a roll-back step, the upward (or negative) velocity of extrudate 72 along longitudinal axis 74 in an opposite direction from arrow 70 may also be determined as a function of the spatial shift of speckle pattern 108 between successive frames.

Detector 100 and/or controller assembly 46 may also calculate the volumetric flow rate of extrudate 72 based on the predicted average cross-sectional area of extrudate 72 and the determined velocity. Alternatively, as discussed below, detector 100 may also include a second sensor (not shown in FIG. 6) for measuring the width of extrudate 72 at each frame. In this embodiment, the actual volumetric flow rate may then be calculated based on the measured extrudate width and the determined velocity.

Figure 7:
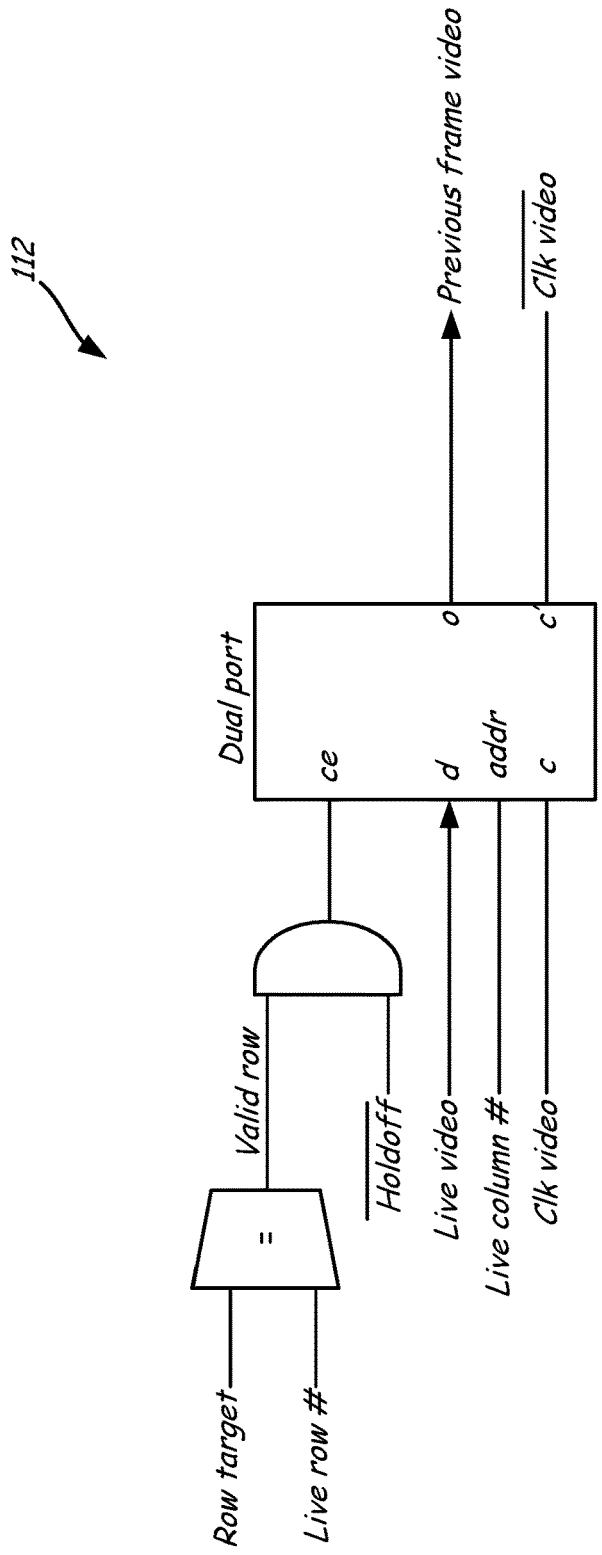
FIGS. 7 and 8 are example logic diagrams for processing the speckle patterns over successive frames.
Figure 8:
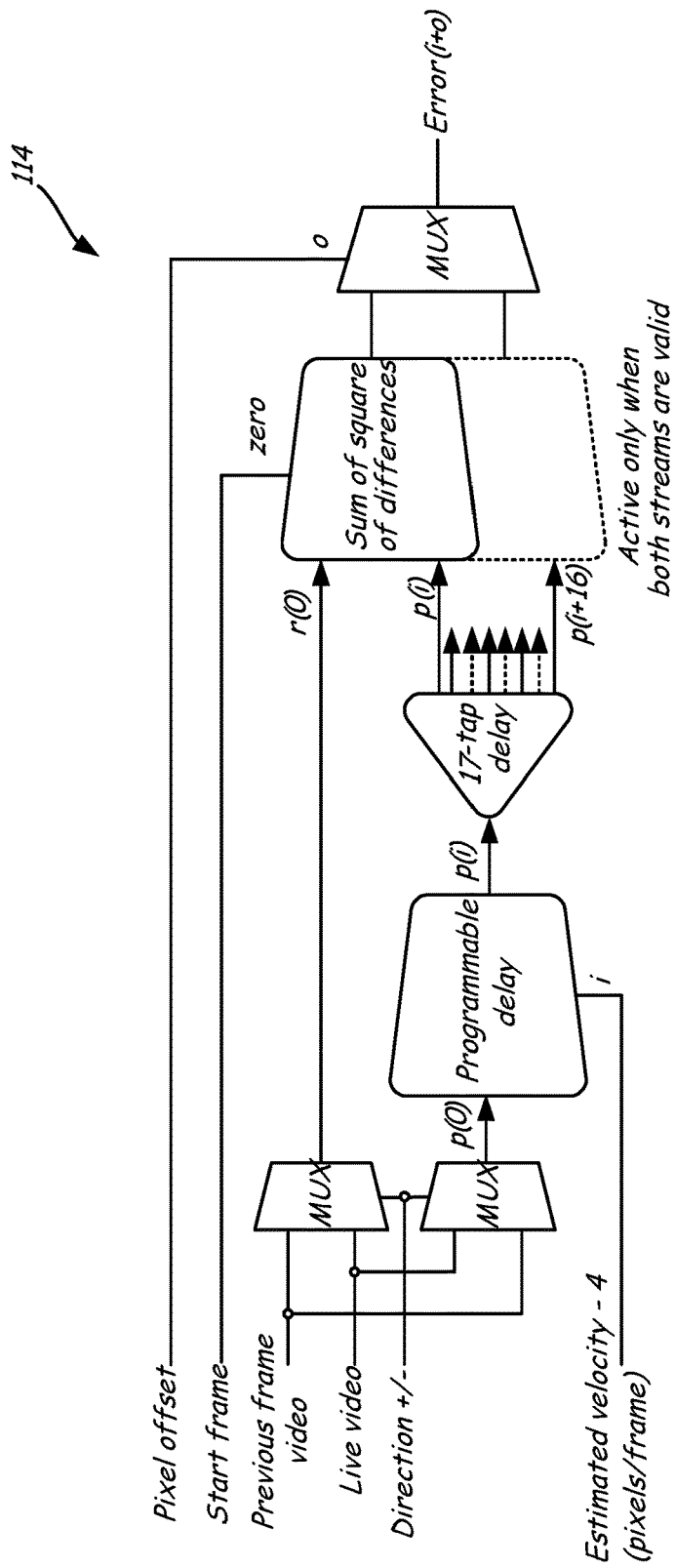
Figure 9:
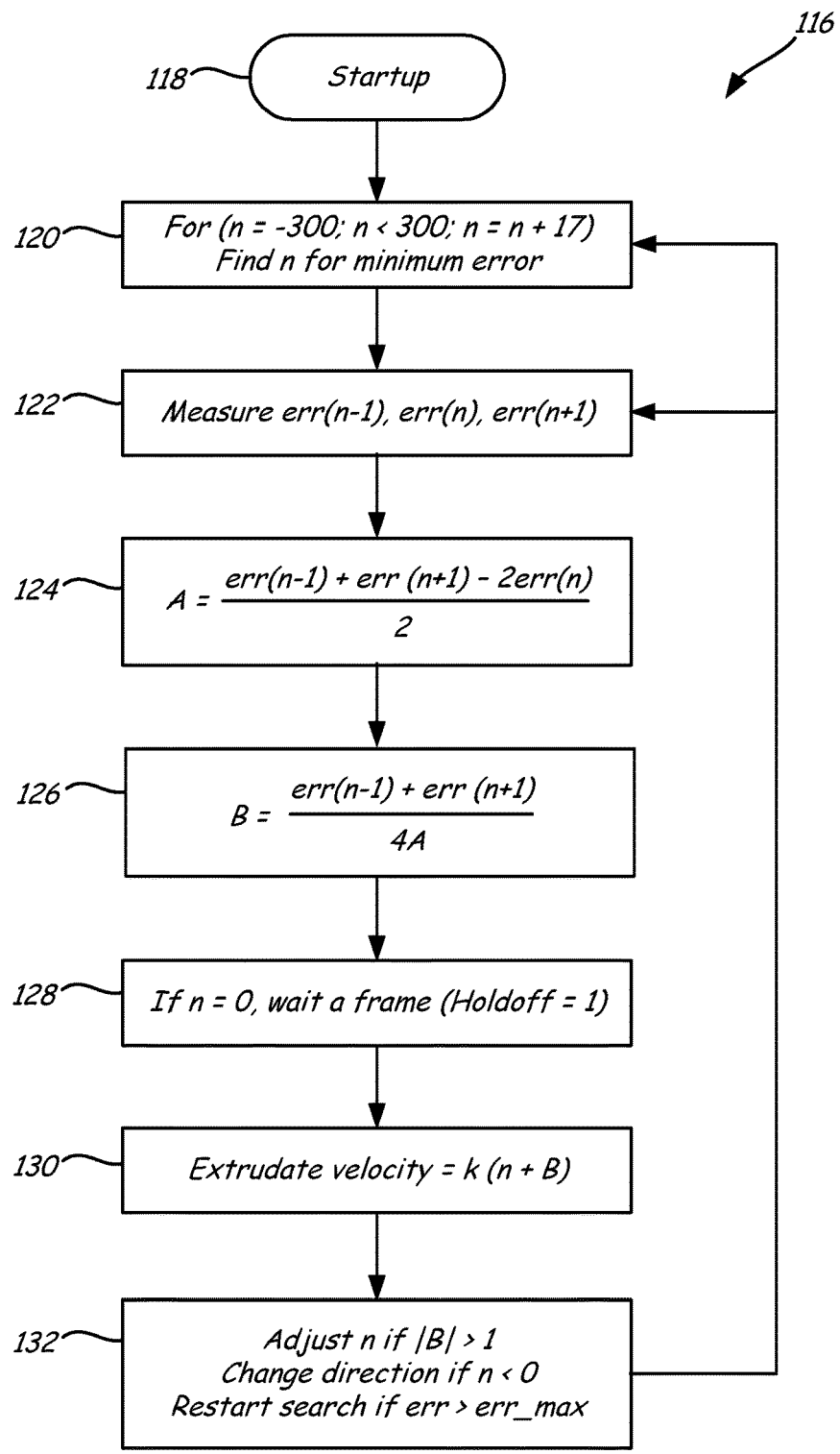
FIG. 9 is a flow diagram of an example method for determining an extrudate velocity from the processed speckle patterns.

FIGS. 7-9 illustrate an example technique and algorithm for determining the spatial shift of speckle pattern 108 between successive frames (e.g., frames 110a, 110b, and 110c). For example, a mis-match between successive frames may be determined by Equation 2:

$$Err(i) = \frac{1}{W-i} \sum_c (I(f, r, c+i) - I(f+1, r, c))^2 \qquad \text{(Equation 2)}$$

where I(f, r, c) is the video or signal intensity of the pixel 106 from frame "f", row "r" and column "c"; "i" is the number of pixels 106 that each successive frame is delayed by along longitudinal axis 74; and "W" is the total number of pixels in sensor 106 along longitudinal axis 74 that are used to capture the frames.

FIGS. 7 and 8 correspondingly illustrate example logic diagrams 112 and 114 for comparing speckle patterns 108 of successive frames. For example, as shown by logic diagram 112 in FIG. 7, one of the rows of pixels 106 along longitudinal axis 74 may capture a frame in a dual port random access memory (RAM) module. Furthermore, a line from a previous frame may be read out by a complimentary clock, so that one dual port RAM module can store both a new line and recall the previous line.

As discussed above, velocimetry assembly 66 measures extrudate flow rates by comparing speckle data over two or more successive measurements (i.e., over two or more captured frames). Due to this required chronological comparison, a speckle pattern 108 in a single frame itself does not provide enough information to measure the extrudate flow rate. As such, as shown by logic diagram 114 in FIG. 8, if the velocity of extrudate 72 is positive (i.e., moving along longitudinal axis 74 in the direction of arrow 70), the live image needs to be delayed.

Alternatively, if the velocity of extrudate 72 is negative, (i.e., moving along longitudinal axis 74 opposite of the direction of arrow 70) the previous frame image needs to be delayed. The amount of delay varies with the velocity of extrudate 72, and can be up to one-half of the number of pixels in sensor 106 along longitudinal axis 74 that are used to capture the frames (i.e., W/2).

As further shown in FIG. 8, the sum of the squares of the differences between the two line scans may be computed for multiple different delays simultaneously (e.g., seventeen different delays), both because the delay may not be an estimated delay, and because the rate of change of the error near the best fit delay may allow extrapolation of a more precise velocity of extrudate 72. Velocimetry assembly 66 (or controller assembly 46) may then conduct a search for the delay with the best fit or lowest error delay, which may then be used and updated in subsequent frames. In alternative embodiments, velocimetry assembly 66 may use any suitable logic design to perform this function, such as with comb filters. When all seventeen errors have been measured, the smallest set (e.g., smallest three) may be used in an algorithm, such as depicted by method 116 in FIG. 9, which may be performed by controller assembly 46 to determine the measured velocity and the estimated delay for the next frame.

As shown in FIG. 9, method 116 includes steps 118-132 for determining the measured velocity of extrudate 72 and the estimated delay for the next frame captured by detector 100. As mentioned above, the flow rate of extrudate 72 out of nozzle 62 does not always respond the same to changes in the feed rate of filament 64. For example, extrudate 72 may flow at different rates from nozzle 62 for the same feed rate of filament 64 into liquefier tube 76. This is due to numerous non-steady state conditions within liquefier tube 64, such as changes in the melt flow characteristics of the consumable material, previous changes in filament feed rates and extrudate flow rates (e.g., during previous starting, stopping, accelerating, and/or decelerating), response time delays, and the like.

To account for these numerous non-steady state conditions, method 116 performs a best fit analysis to identify how the velocity of extrudate 46 responds to different operating conditions, as shown in steps 120, 122, 124, 126, and 130, for example. If the best fit delay is zero (step 128), the direction may be changed for the next frame, which switches whether the live or stored data is delayed with respect to the other.

Furthermore, if the best fit delay is zero for both the positive direction (i.e., in the direction of arrow 70) and the negative direction (i.e., opposite of the direction of arrow 70), the stored frame is not updated until the best fit delay is non-zero. This changes the conversion of pixel delay to velocity, but allows greater precision for near-zero velocities of extrudate 72. For the extrapolation calculation to be valid, there are preferably multiple pixels per speckle spacing S (e.g., seventeen pixels per speckle spacing S).

Furthermore, extrudate 72 has a maximum velocity and a maximum acceleration that can be monitored and processed by detector 100. For example, the maximum velocity "$v_{max}$" of the speckles that can be monitored by a detector 100 with a frame rate of "R" (in hertz) may be determined by Equation 3:

$$v_{max} = \frac{\lambda DR}{16p} \qquad \text{(Equation 3)}$$

where "$\lambda$," is the wavelength of laser beam 102 as defined above, "D" is the distance between pixels 106 and the surface of extrudate 72 in a direction along the x-axis (i.e., perpendicular to longitudinal axis 74) as defined above, and "p" is the average size of each pixel in sensor 106 along longitudinal axis 74.

The maximum velocity of extrudate 72 may depend on a variety of factors, including the drive pressure in liquefier tube 76, the composition of extrudate 72, the extent of melting of extrudate 72, the dimensions of nozzle 62, and the like. However, a suitable volumetric flow rate for extrudate 72 having an 18-mil average diameter may be about 300 micro-cubic inches/second (mics), which corresponds to an velocity of about 1.2 inches/second. For a distance "D" between the pixels of sensor 106 and the surface of extrudate 72 of about two inches, a pixel size "p" of about 4 micrometers, a laser spot size "L" of about 40 mils, and a laser beam wavelength of about 650 nanometers, this only requires a frame rate of about 60 hertz, which is readily attainable with a variety of commercially available CMOS image sensors.

The maximum acceleration (or deceleration) of extrudate 72 is a measure of how far off the estimated velocity can be and still find the minimum error delay. With the above-discussed algorithm for method 116, the estimated delay can be in error by seventeen pixels at most, providing a maximum acceleration "$A_{max}$" for the above-discussed embodiment as determined by Equation 4:

$$A_{max} = 17 \, p \, R^2 \quad \text{(Equation 4)}$$

Following the previous example, extrudate 72 may decelerate from a volumetric flow rate of about 300 mics to zero mics at an initial rate of about 3,000 mics/second, corresponding to an acceleration of about 0.03 g-forces. For a pixel size "p" of about 4 micrometers, this acceleration/deceleration also only requires a frame rate of about 60 hertz.

If greater velocities are desired, such as for faster printing rates, any easy adjustment to make is to select a detector 100 having a faster frame rate. Accordingly, suitable frame rates for detector 100 include frame rates of at least about 50 hertz, more preferably at least about 60 hertz, and even more preferably at least about 100 hertz. In some embodiments, a higher-end CMOS or CCD chip may be utilized having very fast frame rates, such as frame rates greater than about 1 kilohertz, more preferably greater than 10 kilohertz, and even more preferably greater than 20 kilohertz.

For example, for a distance "D" is the distance between sensor 106 and the surface of extrudate 72 of about two inches, a sensor pixel array of 2,080 pixels each with a pixel size "p" of about 4 micrometers, a laser spot size "L" of about 20 mils, a laser beam peak wavelength of about 640 nanometers, and a frame rate of about 28 kilohertz, about 50 to about 100 speckles may be detected, which provides a good compromise between flow rate and detector sensitivity.

The above-discussed velocimetry assembly 66 is suitable for determining velocities for extrudate 72 after exiting nozzle 62. Signals relating to the measured velocities may be relayed to controller assembly 46 via communication line 48, which may then perform one or more functions based on the received signals, as discussed above. For example, in the first embodiment, velocimetry assembly 66 may be used as a calibration tool for each print head 18 (e.g., at a purge station 24 or a separate, stand-alone station). Alternatively, in the second embodiment, velocimetry assembly 66 may determine extrudate flow rates while printing 3D part 20 and support structure 22. Each of these uses can assist in reducing response time delays, and in improving part quality and printing rates.

Additionally, filament-feed velocimetry assembly 68 (shown in FIG. 3) may be used in the same manner as velocimetry assembly 66 to measure feed rates of filament 68 fed to print head 18 via drive mechanism 58 (or other filament drive mechanism). This may assist in further reducing response times, and may also detect potential filament feed issues, such as filament breakage, jamming, and the like. Additionally, controller assembly 46 may compare the flow and feed rates from velocimetry assemblies 66 and 68 to perform additional functions for system 10, such as for detecting filament slippage at drive mechanism 58.

Figure 10:
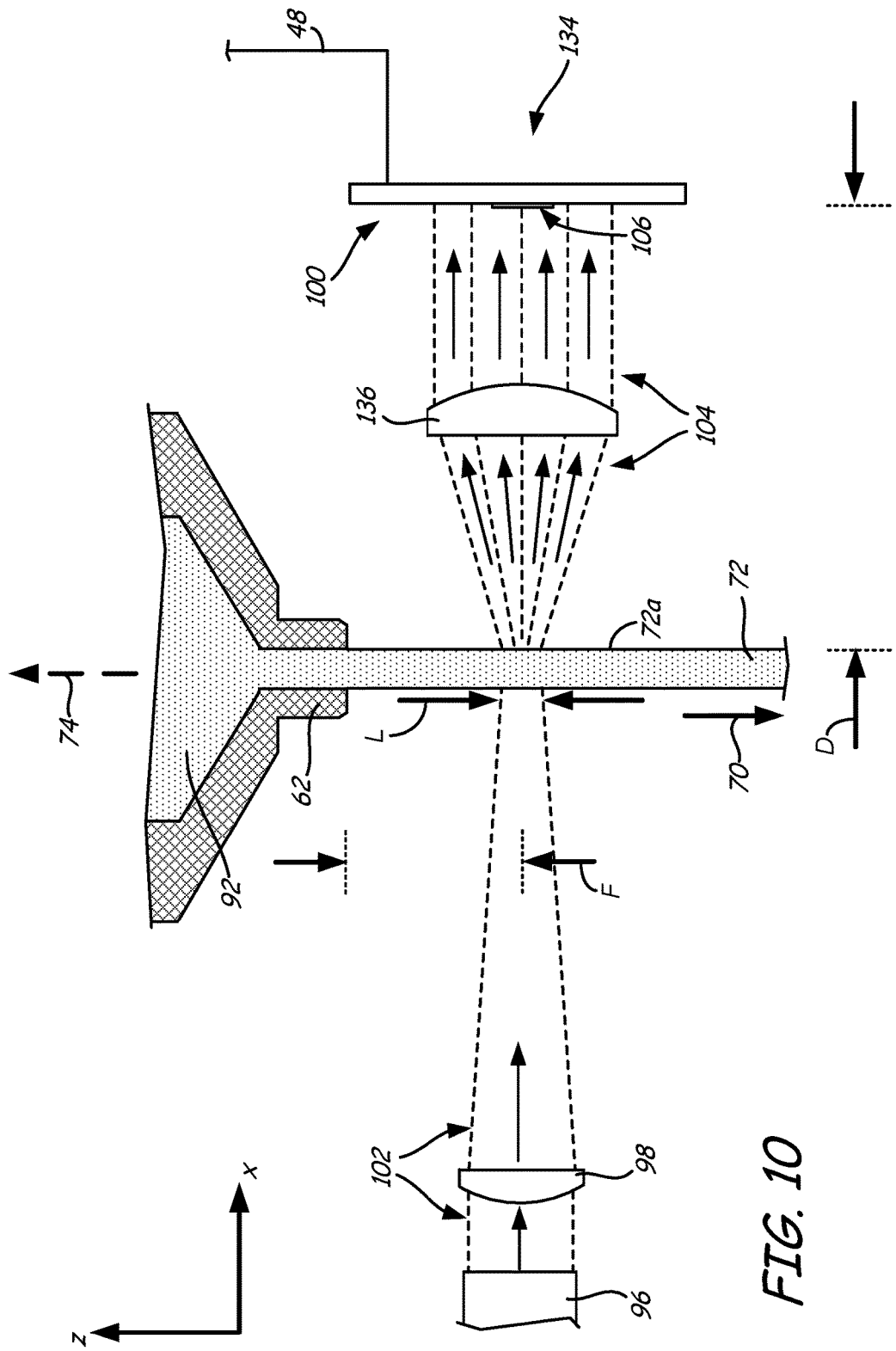
FIG. 10 is an expanded view of the nozzle of the liquefier assembly in use with a first alternative extrudate velocimetry assembly, which utilizes a transmission-forward-scatter pattern.

FIG. 10 illustrates a second embodied extrudate velocimetry assembly 134 for use with system 10 as a replacement for velocimetry assembly 66. As shown, velocimetry assembly 134 may function in a similar manner to velocimetry assembly 66. However, in this case, detector 100 is located at an opposing side of extrudate 72 from laser source 96. This takes advantage of the scattering of the light rays of laser beam 102, which also exhibit a transmission-forward-scatter pattern, as shown.

This configuration is preferred as it provides the highest intensity light, which correspondingly reduces the integration time for detector 100. In fact, the laser power required for the configuration can be reduced by about ten times compared to the reflection-based scatter configuration discussed above for velocimetry assembly 66. This reduced integration time can increase the frame rate of detector 100, which, as discussed above, increases the maximum velocity and acceleration/deceleration that detector 100 can monitor.

As shown in FIG. 10, velocimetry assembly 134 may also include one or more optic lenses 136 (a single lens 135 is shown), which may include any suitable lens or set of lenses for optically expanding, condensing, collimating, and/or routing scattered rays 104 toward detector 100. Detector 100 may operate in the same manner as discussed above in velocimetry assembly 66, but with the increased usable frame rate due the shorter integration times.

As mentioned above, depending on the composition and color of the consumable material for extrudate 72, extrudate 72 may be partially transmissive such that the focal volume of laser beam 102 may penetrate into extrudate 72 to illuminate the core region of extrudate 72, for example. This will affect the dimensions for length "L", as well as the scatter pattern of rays 104.

In this embodiment utilizing a transmission-forward-scatter pattern, the focal volume of laser beam 102 may be located either at core region or at extrudate surface 72a. If located at extrudate surface 72a, the focal volume of laser beam 102 is preferably maintained at a point that is sufficiently distant from nozzle 62 such that the radial velocity gradient substantially equalizes between extrudate surface 72a and the core region of extrudate 72. As discussed above, the resulting velocity determined by velocimetry assembly 66 may then correspond to an average velocity with a low standard deviation over the radius of extrudate 72.

Measuring the velocity of extrudate 72 at a point that is further away from nozzle 62 may also be beneficial for reducing the risk of having water vapor interfere with the scattering of laser beam 102, which can otherwise produce a false speckle velocity. Additionally, the further distance reduces the risk of sensing light that scatters from nozzle 62.

Examples of suitable distances along longitudinal axis 74 from nozzle 62 for positioning the center of the focal volume of laser beam 102, referred to as distance "F", for this application include distances of at least about 10 mils, more preferably from about 15 mils to about 50 mils, and even more preferably from about 20 mils to about 30 mils. Suitable distances "L" for use with these distances "F" include those discussed above, and may even more preferably range from about 10 mils to about 30 mils. These ranges have been found to be suitable for multiple tip pipe inner diameters for nozzle 62, such as tip pipe inner diameters of about six mils to about twelve mils, for example.

However, in some situations, it may be preferred to measure extrudate at a point that is closer to nozzle 62, where extrudate surface 72a and the core region flow at different rates. For example, the closer location to nozzle 62 reduces the amount that extrudate 72 may wander from the axis of nozzle 62. Additionally, the closer segments of extrudate 72 also typically exhibit less stretching by the weight of previously-extruded materials, and may exhibit less distortion from a circular cross-section. Accordingly, in these situations, the focal volume of laser beam 102 may be located at the core region of extrudate 72. The resulting velocity determined by velocimetry assembly 66 may then correspond to the velocity of the core region of extrudate 72.

Figure 11:
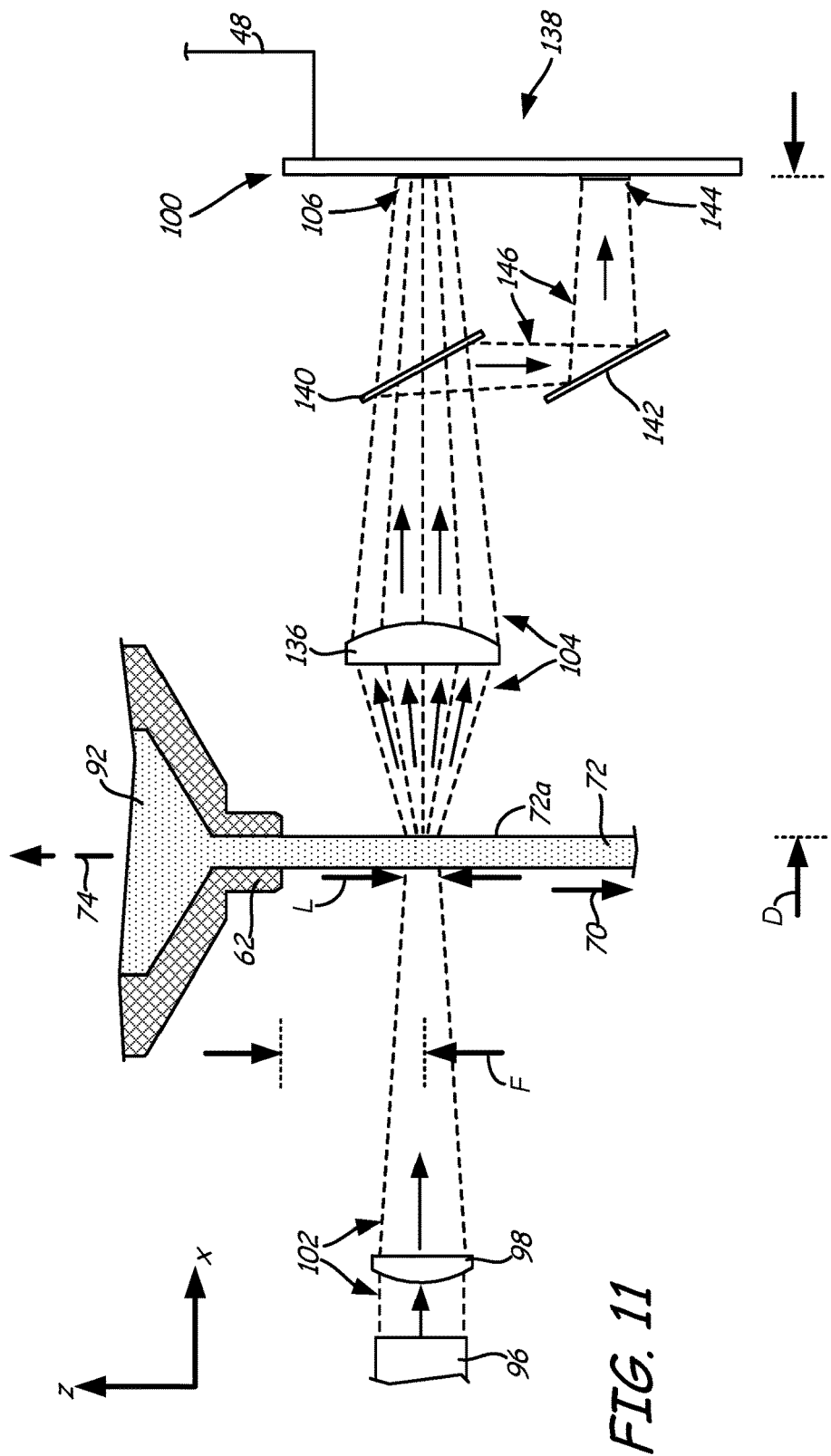
FIG. 11 is an expanded view of the nozzle of the liquefier assembly in use with a second alternative extrudate velocimetry assembly, which utilizes a transmission-forward-scatter pattern, and which includes photodetector pixels for measuring extrudate widths.
Figure 12:
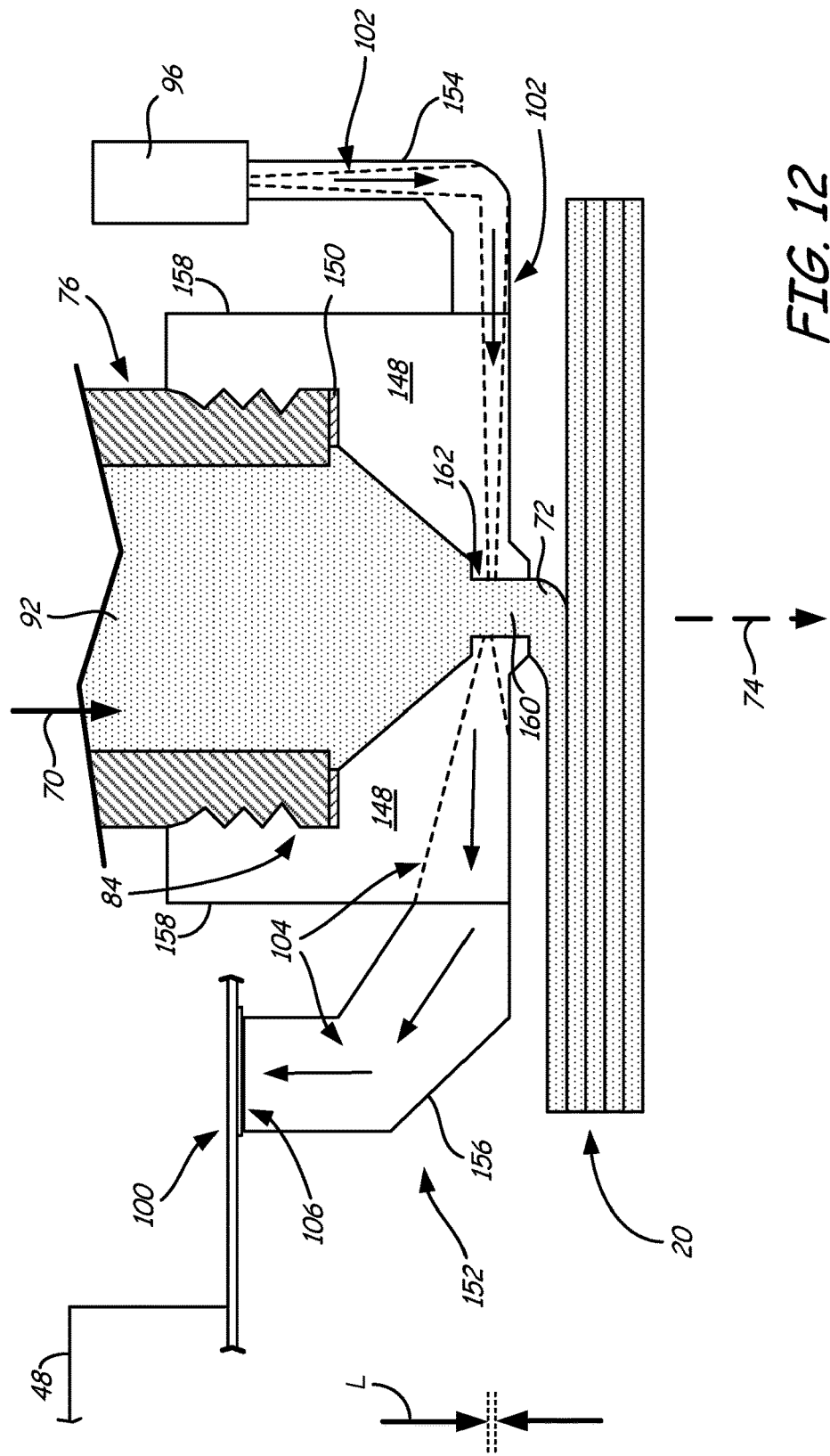
FIG. 12 is an expanded view of an alternative nozzle of the liquefier assembly in use with an alternative pre-extrudate velocimetry assembly, which utilizes a transmission-forward-scatter pattern.

FIG. 11 illustrates a third embodied extrudate velocimetry assembly 138, which may function in a similar manner to velocimetry assembly 134 (shown in FIG. 10). However, in this case, velocimetry assembly 138 also includes beam splitter 140 and mirror 142, and detector 100 also includes a second sensor 144 of photodetector pixels. In this embodiment, sensors 106 and 144 may each include a single array of pixels extending along the longitudinal axis 74 (i.e., 1D sensors). Sensor 106 may function in the same manner as discussed above to determine the velocity of extrudate 72.

In comparison, sensor 144 receives the split rays 146 from scattered rays 104, which are routed from beam splitter 140 and mirror 142 to the pixels of sensor 144. Sensor 144 is also preferably synchronized in timing with the frame captures of sensor 106 and the pulsing of laser beam 102. This allows sensor 144 to measure the widths of successive segments of extrudate 72 that are illuminated by the focal volume of laser beam 102. These measured widths may be converted to cross-sectional areas, which, when combined with the determined velocities, allows detector 100 (and/or controller assembly 46) to determine the volumetric flow rates of extrudate 72 (rather than relying on a predicted cross-sectional area, as discussed above).

In this embodiment, the focal volume of laser beam 102 is preferably positioned at the extrudate surface 72a, and maintained at a point that is sufficiently distant from nozzle 62 such that the radial velocity gradient substantially equalizes between extrudate surface 72a and the core region of extrudate 72. As discussed above, the resulting velocity determined by velocimetry assembly 66 may then correspond to an average velocity with a low standard deviation over the radius of extrudate 72. This also allows the split rays 146 to account for the entire width of extrudate 72 when received by sensor 144.

As discussed above, upon exiting nozzle 62, extrudate 72 typically exhibits die swelling that can vary the diameter of extrudate by as much as 35%. As such, by measuring the width (i.e., diameter) of extrudate 72 at the segment that is illuminated by laser beam 102, the cross-sectional area of the illuminated segment of extrudate 72 can be measured. Combining the measured cross-sectional area and the measured velocity may then provide volumetric flow rate for the illuminated segment of extrudate 72.

One limitation of velocimetry assemblies 66, 134, and 138 is that they each require a line-of-sight to extrudate 72 to direct laser beam 102 and to receive the scattered rays 104. In some extrusion-based additive manufacturing systems, nozzle 62 may positioned close the underlying layers of 3D part 20 and support structure 22. This could potentially prevent velocimetry assemblies 66, 134, and 138 from reaching extrudate 72 upon exiting nozzle 62.

Instead, in an alternative embodiment, the velocimetry assembly may be integrated into the nozzle to monitor the velocity of pre-extrudate prior to exiting nozzle 62. For example, as shown in FIG. 12, nozzle 148 may be secured to outlet end 84 of liquefier tube 76 in a screw-engagement manner (or with any other suitable engagement) with a washer 150 (e.g., an indium washer) that functions as a pressure seal, where nozzle 148 may be fabricated from a transparent material, such as a glass.

Velocimetry assembly 152 may accordingly include laser source 96, inlet light pipe 154, outlet light pipe 156, and detector 100, where inlet light pipe 154 and outlet light pipe 156 may be coupled to an external cylindrical surface 158 of nozzle 148, allowing laser beam 102 to illuminate pre-extrudate 160 in a tip pipe 162 of nozzle 148. Examples of suitable dimensions for tip pipe 162 include those discussed above for nozzle 62.

The couplings between light pipes 154 and 156 and surface 158 of nozzle 148 preferably allow laser beam 102 and scattered rays 104 to transmit through the surface coupling without substantially scattering or undue transmission loss. In some embodiments, the couplings may fixedly secure light pipes 154 and 156 to surface 158. Alternatively, light pipes 154 and 156 may be integrally fabricated with nozzle 148 as a single piece. In a further alternative, and more preferred embodiment, light pipes 154 and 156 may be coupled to surface 158 in a manner that allows light pipes 154 and 156 to mechanically separate from nozzle 148. This embodiment is beneficial when nozzle 148 needs to be replaced, allowing the same liquefier tube 76 and light pipes 154 and 156 to be used with multiple, interchangeable nozzles 148.

As shown, laser source 96 generates laser beam 102, which is routed through inlet light pipe 154 and nozzle 148 toward tip pipe 162. At tip pipe 162, laser beam 102 contacts pre-extrudate 160 prior, which scatters the light of laser beam 102 with the same transmission-forward-scatter pattern as discussed above for velocimetry assemblies 134 and 138 (shown in FIGS. 10 and 11). The resulting scattered rays 104 may then transmit through nozzle 148 and into outlet light pipe 156, where they may be collected and routed to detector 100 for processing, as discussed above.

The distance "D" between the pixels of sensor 106 and the focal volume of laser beam 102 in or at pre-extrudate 160 in tip pipe 162 is the average distance that the routed light rays 102 travel through nozzle 148 and outlet light pipe 156, which, in this case, does not follow a liner path. Preferably, in this embodiment, the focal volume of laser beam 102 is positioned at the core region of pre-extrudate 72 to reduce the extent that shear effects of the inner surface of tip pipe 62 at the surface of pre-extrudate 160 affect the determined velocity.

This technique has the advantage that pre-extrudate 160 in tip pipe 162 may be maintained at a near constant temperature, which prevents changes in speckling and allows the molten material to retain a substantially constant level of optical transmission. Furthermore, since the dimensions of tip pipe 162 are constant (assuming no scaling or material accumulation), the cross-sectional area of pre-extrudate 160 is known, allowing the volumetric flow rate of pre-extrudate 160 (and therefore, of extrudate 72) to be readily calculated from its determined velocity.

Velocimetry assembly 152 illustrates an example nozzle and velocimetry assembly of system 10 and/or print head 18 that may be used to determine velocities and volumetric flow rates in a quasi-real time manner during printing operations to print 3D part 20 and support structure 22. Based on the determined velocities and/or volumetric flow rates, controller assembly 46 may perform one or more functions to compensate for flow variations. Furthermore, velocimetry assembly 152 also be used as a calibration tool, as discussed above, and/or for any other suitable use in system 10 (e.g., detecting tip clogging). Each of these uses can assist in reducing response time delays, and in improving part quality and printing rates with system 10.

Although the present disclosure has been described with reference to preferred embodiments, workers skilled in the art will recognize that changes may be made in form and detail without departing from the spirit and scope of the disclosure.

The invention claimed is:

1. A method of calibrating a print head for use in an additive manufacturing system, the method comprising:
   extruding a molten material from the print head as an extrudate;
   routing a pulsed laser beam toward the extrudate to scatter light rays of the pulsed laser beam from the extrudate;

detecting at least a portion of the scattered light rays with a detector over multiple sequential captured frames captured at time intervals based upon a timing of the pulsing of the laser beam, wherein each captured frame has a speckle pattern;

processing the captured frames with a controller to generate speckle patterns;

comparing the speckle patterns of the sequential multiple captured frames;

determining a spatial shift in the speckle patterns;

calculating a velocity of the extrudate with the controller based on the determined spatial shift and the time intervals;

determining at least one average flow rate of the extrudate based at least on the calculated velocity; and producing calibration information for the print head based upon the at least one average flow rate.

2. The method according to claim 1, further comprising:
installing the print head in an additive manufacturing system; and
printing layers of a three-dimensional part using the print head based on the calibration information.

3. The method according to claim 2, further comprising transmitting the calibration information to a controller assembly of the additive manufacturing system.

4. The method according to claim 2, wherein:
extruding the molten material comprises:
feeding a consumable material to the print head using a drive mechanism based on a feed rate setting; and
melting the consumable material in the print head to produce the molten material; and
producing the calibration information for the print head includes producing the calibration information based upon the feed rate setting.

5. The method according to claim 2, wherein extruding the molten material and routing the pulsed laser beam are performed before the print head is installed in the additive manufacturing system.

6. The method according to claim 2, wherein extruding the molten material and routing the pulsed laser beam include installing the print head in a stand-alone station that is separate from the additive manufacturing system.

7. The method according to claim 2, wherein installing the print head in the additive manufacturing system occurs before extruding the molten material from the print head.

8. The method of claim 1, wherein determining the at least one average flow rate of the extrudate comprises:
calculating the at least one average flow rate of the extrudate with the controller based upon the calculated velocity and a precalculated cross-sectional area of the extrudate.

9. The method of claim 1, wherein determining the at least one average flow rate of the extrudate comprises:
sensing a width of the extrudate for each sequential captured frame; and
calculating the at least one average flow rate of the extrudate with the controller based upon the calculated velocity and sensed width of the extrudate.

10. A method of calibrating a print head for use in an additive manufacturing system, the method comprising steps of:
feeding a consumable material to the print head using a drive mechanism based on a current feed rate setting having a predicted average flow rate;
melting the consumable material in the print head to produce a molten material;
extruding the molten material from the print head as an extrudate;
routing a pulsed laser beam toward the extrudate to scatter light rays of the pulsed laser beam from the extrudate;
detecting at least a portion of the scattered light rays with a detector over multiple sequential captured frames captured at time intervals based upon a timing of the pulsing of the laser beam, wherein each captured frame has a speckle pattern;
processing the captured frames with a controller to generate speckle patterns;
comparing the speckle patterns of the multiple captured frames;
determining a spatial shift in the speckle patterns;
calculating a velocity of the extrudate with the controller based on the determined spatial shift and the time intervals;
determining an average flow rate of the extrudate at the current feed rate setting based at least on the calculated velocity;
comparing the determined average flow rate to the predicted average flow rate;
updating calibration information for the print head based on the determined average flow rate;
changing the current feed rate setting to another feed rate setting having another predicted flow rate; and
repeating the steps a limited number of times.

11. The method according to claim 10, further comprising:
installing the print head in an additive manufacturing system; and
printing layers of a three-dimensional part using the print head based on the calibration information.

12. The method according to claim 11, further comprising transmitting the calibration information to a controller assembly of the additive manufacturing system.

13. The method according to claim 11, wherein extruding the molten material and routing the pulsed laser beam are performed before installing the print head in the additive manufacturing system.

14. The method according to claim 13, wherein extruding the molten material and routing the pulsed laser beam include installing the print head in a stand-alone station that is separate from the additive manufacturing system.

15. the method according to claim 11, wherein installing the print head in the additive manufacturing system occurs before extruding the molten material from the print head.

16. The method of claim 10, wherein determining the average flow rate of the extrudate comprises:
calculating the average flow rate of the extrudate with the controller based upon the calculated velocity and a precalculated cross-sectional area of the extrudate.

17. The method of claim 10, wherein determining the average flow rate of the extrudate comprises:
sensing a width of the extrudate for each sequential captured frame; and
calculating the average flow rate of the extrudate with the controller based upon the calculated velocity and sensed width of the extrudate.

* * * * *